(12) United States Patent
Chan et al.

(10) Patent No.: US 11,440,237 B2
(45) Date of Patent: Sep. 13, 2022

(54) METHOD AND SYSTEM FOR FORMING A BLADDER

(71) Applicant: NIKE, Inc., Beaverton, OR (US)

(72) Inventors: Wesley K. Chan, Portland, OR (US);
Scott C. Holt, Portland, OR (US);
Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 254 days.

(21) Appl. No.: 16/715,073

(22) Filed: Dec. 16, 2019

(65) Prior Publication Data

US 2020/0189171 A1 Jun. 18, 2020

Related U.S. Application Data

(60) Provisional application No. 62/780,785, filed on Dec. 17, 2018.

(51) Int. Cl.
| | | |
|---|---|---|
| *B29C 49/48* | (2006.01) | |
| *B29D 35/12* | (2010.01) | |
| *A43B 13/20* | (2006.01) | |
| *B29L 31/50* | (2006.01) | |

(52) U.S. Cl.
CPC ...... *B29C 49/4802* (2013.01); *B29C 49/4817* (2013.01); *B29D 35/122* (2013.01); *B29D 35/128* (2013.01); *A43B 13/20* (2013.01); *B29C 2049/4869* (2013.01); *B29L 2031/504* (2013.01)

(58) Field of Classification Search
CPC ......... A43B 23/029; A43B 7/32; A43B 5/025; A43B 13/20; B29C 49/4817; B29C 49/4802; B29C 49/0047; B29C 2049/4869; B29D 35/126; B29D 35/122; B29D 35/128; B29L 2031/504
See application file for complete search history.

(56) References Cited

U.S. PATENT DOCUMENTS

| | | |
|---|---|---|
| 2003/0098118 A1 | 5/2003 | Rapaport |
| 2014/0173937 A1 | 6/2014 | Smith et al. |
| 2018/0064207 A1 | 3/2018 | Hurd et al. |
| 2018/0332925 A1 | 11/2018 | Bailey et al. |

FOREIGN PATENT DOCUMENTS

TW 201703668 A 2/2017

OTHER PUBLICATIONS

Taiwan Patent Office Notice of Allowance for Application 110111774 dated May 13, 2021.
European Patent Office (ISA), International Search Report and Written Opinion for International Application No. PCT/US2019/066480, dated Mar. 30, 2020.

*Primary Examiner* — Monica A Huson
(74) *Attorney, Agent, or Firm* — Honigman LLP; Matthew H. Szalach; Jonathan O'Brien

(57) ABSTRACT

A method for forming a bladder comprises providing a mold including a chamber wall having a first height and a cavity wall having a second height. The cavity wall is surrounded by the chamber wall and defines a plurality of cavities. A first sheet, a second sheet, and a gasket are provided to the mold, whereby the gasket is disposed adjacent to at least one of the first sheet and the second sheet. The mold is moved such that a peripheral portion of the at least one of the first sheet and the second sheet and the gasket are compressed by the chamber wall. A first pressure is provided between the first sheet and the second sheet through the gasket to form a plurality of chambers, and the mold is moved to a second position to seal the first pressure between the first sheet and the second sheet.

19 Claims, 14 Drawing Sheets

FIG. 1

METHOD AND SYSTEM FOR FORMING A BLADDER

CROSS REFERENCE TO RELATED APPLICATIONS

This U.S. patent application claims priority under 35 U.S.C. § 119(e) to U.S. Provisional Application 62/780,785, filed on Dec. 17, 2019. The disclosure of this prior application is considered part of the disclosure of this application and is hereby incorporated by reference in its entirety.

FIELD

The present disclosure relates generally to methods for forming fluid-filled bladders for articles of footwear.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. Sole structures may also include a comfort-enhancing insole or a sockliner located within a void proximate to the bottom portion of the upper and a strobel attached to the upper and disposed between the midsole and the insole or sockliner.

Uppers and sole structures of articles of footwear may incorporate fluid-filled bladders to provide characteristics of cushioning, impact attenuation, and responsiveness. The fluid-filled bladders may be pressurized with a fluid, such as air, and may include one or more chambers. Generally, the chambers of the bladder may be formed by bonding opposing sheets of material at discrete locations to define the boundaries of the respective chambers, and then providing a pressurized fluid to each of the chambers individually.

DRAWINGS

The drawings described herein are for illustrative purposes only of selected configurations and are not intended to limit the scope of the present disclosure.

FIG. 1 is a lateral side perspective view of an example of an article of footwear according to the principles of the present disclosure;

Corresponding reference numerals indicate corresponding parts throughout the drawings.

DETAILED DESCRIPTION

Figure 2:
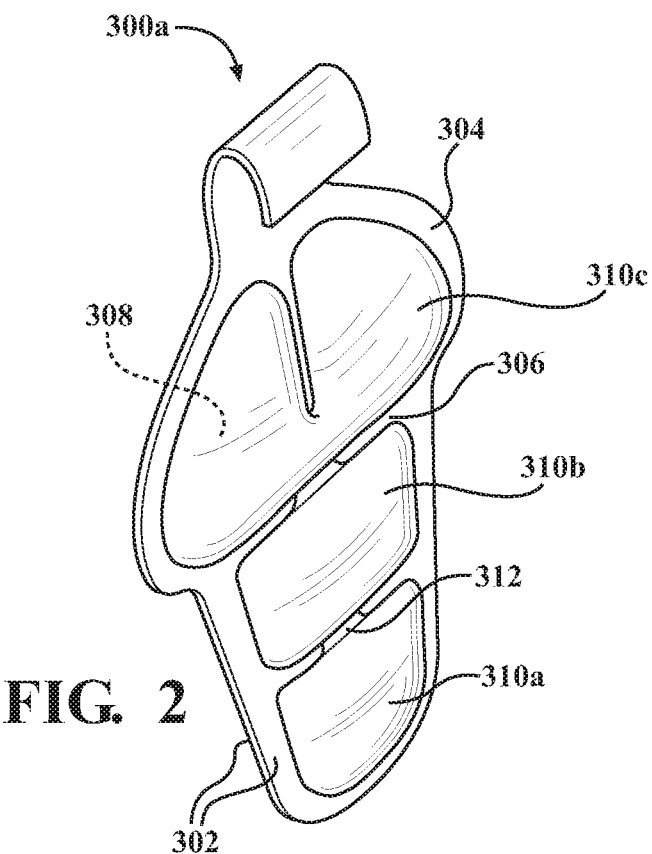
FIG. 2 is a perspective view of a first example of a bladder formed according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure provides a method for forming a bladder. The method comprises inserting a first sheet and a second sheet into a mold and disposing a gasket between the first sheet and the second sheet to define a space between the first sheet and the second sheet, whereby the gasket includes a conduit in fluid communication with the space. The method further includes moving at least one of the first sheet and the second sheet away from the other of the first sheet and the second sheet to expand a volume of the space, and drawing a fluid through the conduit and into the expanded space.

Implementations of the disclosure may include one or more of the following optional features. In some implementations, the method includes moving the mold to a first position to compress the gasket between the first sheet and the second sheet. Optionally, the method may comprise spacing the first sheet apart from the second sheet when the mold is in the first position. In some examples, the method comprises moving the mold to a second position to compress an inner region of the first sheet against an inner region of the second sheet.

In some implementations, the method further comprises attaching the first sheet to the second sheet. Optionally, attaching the first sheet to the second sheet includes welding the first sheet to the second sheet.

In some examples, the methods comprises bonding the first sheet to the second sheet.

In some implementations, the method comprises bonding the first sheet to the second sheet after the fluid is drawn into the expanded space.

In some examples, drawing a fluid through the conduit and into the expanded space includes drawing atmospheric air into the expanded space.

In some implementations, the method further comprises removing the gasket from the bladder.

Another aspect of the disclosure provides a method for forming a bladder. The method comprises inserting a first sheet and a second sheet into a mold, and disposing a gasket against at least one of the first sheet and the second sheet to define a space between the first sheet and the second sheet. The method further includes compressing the gasket against the at least one of the first sheet and the second sheet to seal the space between the first sheet and the second sheet, moving at least one of the first sheet and the second sheet away from the other of the first sheet and the second sheet to expand a volume of the space, and drawing a fluid through the gasket and into the expanded space.

Implementations of the disclosure may include one or more of the following optional features. In some implementations, drawing a fluid through the gasket includes drawing the fluid through a conduit defined by the gasket.

In some examples, the method includes spacing the first sheet apart from the second sheet when the gasket is compressed and the mold is in a first position. Optionally, the method may include moving the mold to a second position to compress an inner region of the first sheet against an inner region of the second sheet. In some examples, the method includes attaching the first sheet to the second sheet. Optionally, attaching the first sheet to the second sheet includes welding the first sheet to the second sheet.

In some implementations, the method includes bonding the first sheet to the second sheet.

In some examples, the method includes bonding the first sheet to the second sheet after the fluid is drawn into the expanded space.

In some implementations, drawing a fluid through the gasket and into the expanded space includes drawing atmospheric air into the expanded space.

In some implementations, the method includes removing the gasket from the bladder.

Figure 1:
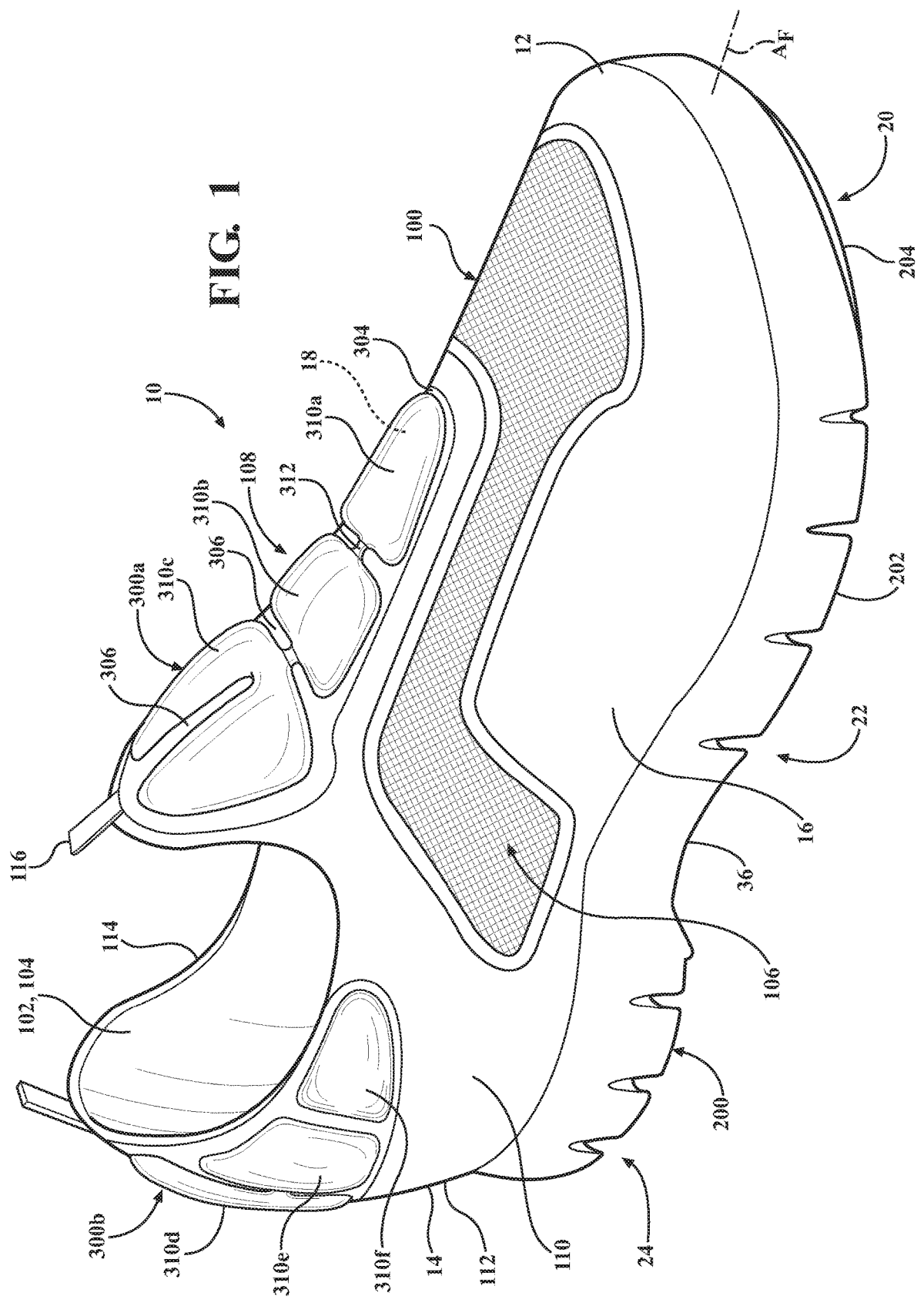

Referring to FIG. 1, an example of an article of footwear 10 according to the principles of the present disclosure is provided. In some implementations, the article of footwear 10 includes an upper 100 and a sole structure 200 attached to the upper 100. The sole structure 200 is attached to the bottom of the upper 100 and includes an outsole 202 forming a ground-engaging surface 26 of the article of footwear 10, and a midsole 204 configured to provide cushioning characteristics. The article of footwear 10 further includes one or more bladders 300a, 300b disposed on an exterior surface of the upper 100.

The footwear 10 may include an anterior end 12 associated with a forward-most point of the footwear 10, and a posterior end 14 corresponding to a rearward-most point of the footwear 10. The footwear 10 further includes a lateral side 16 and a medial side 18 respectively corresponding with opposite sides of the footwear 10 and extending from the anterior end 12 to the posterior end 14. A longitudinal axis $A_F$ of the footwear 10 extends along a direction from the anterior end 12 to the posterior end 14.

The article of footwear 10 may be divided into one or more regions along the longitudinal axis $A_F$. The regions may include a forefoot region 20, a mid-foot region 22 and a heel region 24. The forefoot region 20 may correspond with toes and joints connecting metatarsal bones with phalanx bones of a foot. The mid-foot region 22 may correspond with an arch area of the foot, and the heel region 24 may correspond with rear regions of the foot, including a calcaneus bone.

The upper 100 includes a plurality of components that cooperate to define an interior void 102 and an ankle opening 104, which cooperate to receive and secure a foot for support on the sole structure 200. For example, the upper 100 includes a pair of quarter panels 106 in the mid-foot region 22 on opposite sides of the interior void 102.

A throat 108 extends across the top of the upper 100 and defines an in step region extending between the quarter panels 106 from the ankle opening 104 to the forefoot region 20. The upper 100 may be further described as including heel side panels 110 extending through the heel region 24 along the lateral and medial sides 16, 18 of the ankle opening 104. A heel counter 112 wraps around the posterior end 14 of the footwear 10 and connects the heel side panels 110 to each other. Uppermost edges of the throat 108, the heel side panels 110, and the heel counter 112 cooperate to form a collar 114, which defines the ankle opening 104 of the interior void 102. The upper 100 may include one or more grip features 116 attached to the collar 114 adjacent to the ankle opening 104 for pulling the footwear 10 onto and off of the foot.

The upper 100 may be formed from one or more materials that are stitched or adhesively bonded together to define the interior void 102. Suitable materials of the upper 100 may include, but are not limited to, textiles, foam, leather, and synthetic leather. The example upper 100 may be formed from a combination of one or more substantially inelastic or non-stretchable materials and one or more substantially elastic or stretchable materials disposed in different regions of the upper 100. The one or more elastic materials may include any combination of one or more elastic fabrics such as, without limitation, spandex, elastane, rubber or neoprene. The one or more inelastic materials may include any combination of one or more of thermoplastic polyurethanes, nylon, leather, vinyl, or another material/fabric that does not impart properties of elasticity.

Unlike conventional uppers, the upper 100 of the article of footwear 10 includes a pair of bladders 300a, 300b disposed on an exterior surface of the upper 100. More particularly, the bladders 300a, 300b include a first bladder 300a disposed on the throat 108 of the upper 100, adjacent to the collar 114, and a second bladder 300b extending around the heel counter 112 from a first one of the heel side panels 110 on the lateral side 16 to a second one of the heel side panels 110 on the medial side 18. Generally, the bladders 300a, 300b are configured to attenuate impact related forces to the exterior surface of the upper 100, such as an impact of a kicked ball. However, the bladders 300a, 300b may also be configured for providing desired levels of support and/or flexibility to the upper 100.

Figure 3:
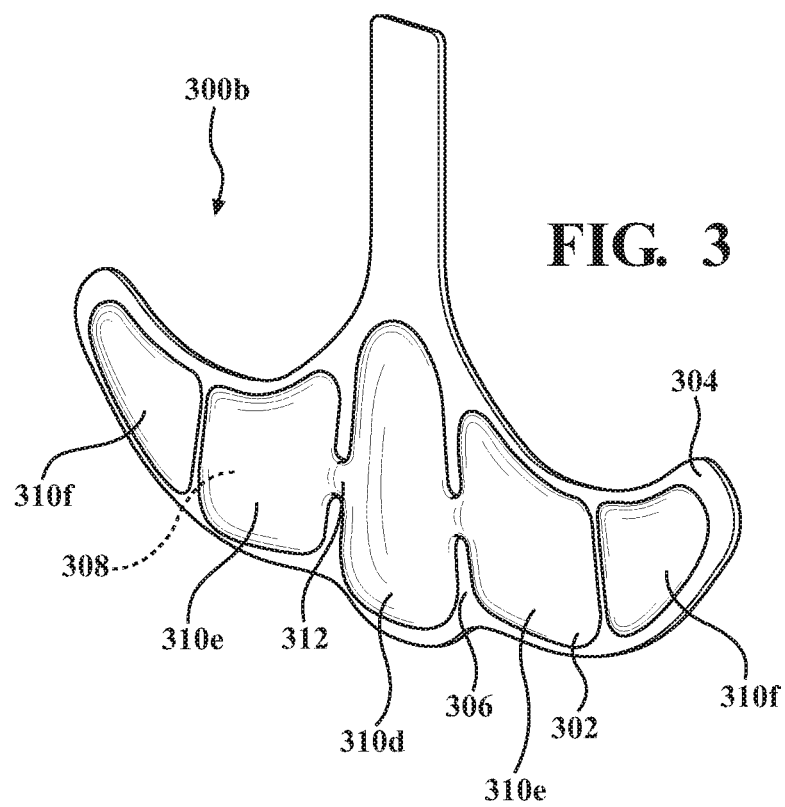
FIG. 3 is a perspective view of a second example of a bladder formed according to the principles of the present disclosure.

With reference to FIGS. 2 and 3, examples of the first bladder 300a and the second bladder 300b are shown. While the geometries of the bladders 300a, 300b are distinguishable, the general construction of the bladders 300a, 300b, is substantially similar. Accordingly, like reference numerals are used in the figures to identify elements of the bladders 300a, 300b that are similar, while reference numerals having a letter suffix indicate components or elements of the bladders 300a, 300b that are unique.

Referring to FIG. 2, the first bladder 300a includes an opposing pair of barrier layers 302 that are joined to each other at discrete locations to define a geometry of the first bladder 300a. As shown, the barrier layers 302 are bonded to each other at a peripheral seam 304 and at a plurality of interior bonds 306. Generally, the peripheral seam 304 defines an outer perimeter of the first bladder 300a and sealingly encloses an interior void 308 of the first bladder 300a. The interior bonds 306 are formed between the barrier layers 302 in an inner region of the first bladder 300a (i.e., inside of the peripheral seam 304), and cooperate to define a plurality of chambers 310a-310c and conduits 312. Thus, the interior void 308 may be described as being subdivided among the plurality of the chambers 310a-310c, whereby portions of the interior void 308 formed by adjacent ones of the chambers 310a-310c are fluidly connected to each other by the conduits 312. As shown, each of the chambers 310a-310c may be formed with a unique outer profile, defined by the peripheral seam 304 and the interior bonds 306.

Referring to FIG. 3, the second bladder 300b includes an opposing pair of the barrier layers 302 that are joined to each other at discrete locations to define a geometry of the second bladder 300b. As shown, the barrier layers 302 are bonded to each other at the peripheral seam 304 and at a plurality of the interior bonds 306. Generally, the peripheral seam 304 defines an outer perimeter of the second bladder 300b and sealingly encloses an interior void 308 of the second bladder 300b. The interior bonds 306 are formed between the barrier layers 302 in an inner portion of the second bladder 300b (i.e., inside of the peripheral seam 304), and cooperate to define a plurality of chambers 310d-310f and conduits 312. Thus, the interior void 308 may be described as being subdivided among the plurality of the chambers 310d-310f, whereby adjacent ones of the chambers 310d, 310e are fluidly connected to each other by the conduits 312. However, unlike the first bladder 300a, at least some of the chambers 310f of the second bladder 300b are fluidly isolated from the other chambers 310d, 310e, whereby the interior bonds 306 and the peripheral seam 304 cooperate to completely surround and enclose the chambers 310f. As shown, each of the chambers 310d-310f may be formed with a unique outer profile, defined by the peripheral seam 304 and the interior bonds 306.

As used herein, the term "barrier layer" (e.g., barrier layers 302) encompasses both monolayer and multilayer films. In some embodiments, one or both of the barrier layers 302 are each produced (e.g., thermoformed or blow molded) from a monolayer film (a single layer). In other embodiments, one or both of the barrier layers 302 are each produced (e.g., thermoformed or blow molded) from a multilayer film (multiple sublayers). In either aspect, each layer or sublayer can have a film thickness ranging from about 0.2 micrometers to about be about 1 millimeter. In further embodiments, the film thickness for each layer or sublayer can range from about 0.5 micrometers to about 500 micrometers. In yet further embodiments, the film thickness for each layer or sublayer can range from about 1 micrometer to about 100 micrometers.

One or both of the barrier layers 302 can independently be transparent, translucent, and/or opaque. As used herein, the term "transparent" for a barrier layer and/or a fluid-filled chamber means that light passes through the barrier layer in substantially straight lines and a viewer can see through the barrier layer. In comparison, for an opaque barrier layer, light does not pass through the barrier layer and one cannot see clearly through the barrier layer at all. A translucent barrier layer falls between a transparent barrier layer and an opaque barrier layer, in that light passes through a translucent layer but some of the light is scattered so that a viewer cannot see clearly through the layer.

The barrier layers 302 can each be produced from an elastomeric material that includes one or more thermoplastic polymers and/or one or more cross-linkable polymers. In an aspect, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C═O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular aspects, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another aspect, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The barrier layers 302 may include two or more sublayers (multilayer film) such as shown in Mitchell et al., U.S. Pat. No. 5,713,141 and Mitchell et al., U.S. Pat. No. 5,952,065, the disclosures of which are incorporated by reference in their entirety. In embodiments where the barrier layers 302 include two or more sublayers, examples of suitable multilayer films include microlayer films, such as those disclosed in Bonk et al., U.S. Pat. No. 6,582,786, which is incorporated by reference in its entirety. In further embodiments, barrier layers 302 may each independently include alternating sublayers of one or more TPU copolymer materials and one or more EVOH copolymer materials, where the total number of sublayers in each of barrier layers 302 includes at least four (4) sublayers, at least ten (10) sublayers, at least twenty (20) sublayers, at least forty (40) sublayers, and/or at least sixty (60) sublayers.

The bladder 300 desirably has a low gas transmission rate to preserve its retained gas pressure. In some embodiments, the bladder 300 has a gas transmission rate for nitrogen gas that is at least about ten (10) times lower than a nitrogen gas transmission rate for a butyl rubber layer of substantially the same dimensions. In an aspect, the bladder 300 has a nitrogen gas transmission rate of 15 cubic-centimeter/square-meter•atmosphere•day ($cm^3/m^2$•atm•day) or less for an average film thickness of 500 micrometers (based on thicknesses of the barrier layers 302). In further aspects, the transmission rate is 10 $cm^3/m^2$•atm•day or less, 5 $cm^3/m^2$•atm•day or less, or 1 $cm^3/m^2$•atm•day or less.

Figure 4A:
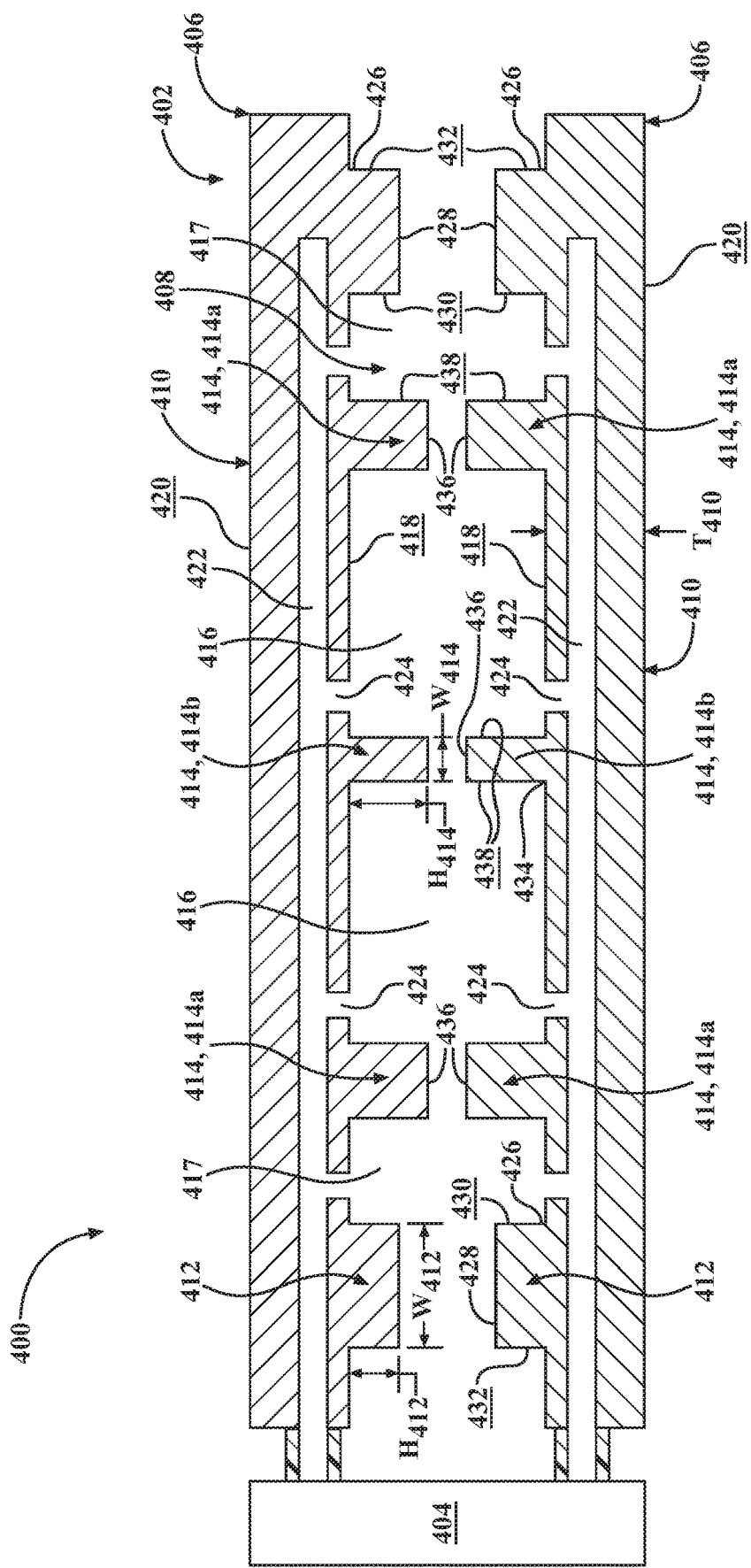
FIG. 4A is a cross-sectional view of a generic system for forming a bladder according to the principles of the present disclosure.

Referring to FIG. 4A, a system 400 for forming a generic example of a bladder 300 according to the principles of present disclosure is shown. The system 400 includes a mold 402 and a vacuum source 404. As shown, the mold 402 includes an opposing pair of platens 406 which cooperate with each other to define a mold chamber 408. As shown, the platens 406 are substantially similar to each other. However, in other examples, geometries of one the platens 406 may be different from geometries of the other one of the platens 406 to impart different characteristics and geometries to the bladder 300. In other examples, one of the platens 406 may be a flat plate, while the other one of the platens 406 includes the geometry defining the mold chamber 408.

With reference to FIG. 4A, each platen 406 includes a base 410, a chamber wall 412 extending from the base 410, and a cavity wall 414 extending from the base 410. As described in greater detail below, the chamber wall 412 provides a fixturing surface for components 500, 502 of a bladder 300, while the base 410, the chamber wall 412, and the cavity wall 414 cooperate to define the mold chamber 408 having a plurality of mold cavities 416, 417.

As shown in FIG. 4A, the base 410 of each platen 406 includes an inner surface 418 and an outer surface 420 formed on an opposite side of the base 410 from the inner surface 418. A distance from the inner surface 418 to the outer surface 420 defines a thickness $T_{410}$ of the base 410. As shown, the base 410 includes a manifold 422 extending along a length of the base 410 between the inner surface 418 and the outer surface 420. The manifold 422 is in communication with the vacuum source 404. As discussed in greater detail below, the base 410 of each platen 406 includes a plurality of ports 424 extending from the manifold 422 and through the inner surface 418 of the base 410, thereby fluidly connecting the manifold 422 to each of the mold cavities 416, 417. Accordingly, each of the mold cavities 416, 417 is in fluid communication with the vacuum source 404 via the manifold 422.

With continued reference to FIG. 4A, the chamber wall 412 of the platen 406 extends from a first end 426 at the inner surface 418 of the base 410 to a distal end 428 at the opposite end of the chamber wall 412 from the first end 426. A distance from the inner surface 418 of the base 410 to the distal end 428 of the chamber wall 412 defines a height $H_{412}$ of the chamber wall 412. The chamber wall 412 further includes an inner peripheral surface 430 and an outer peripheral surface 432 formed on an opposite side of the chamber wall 412 from the inner peripheral surface 430. A distance between the inner peripheral surface 430 and the outer peripheral surface 432 defines a width $W_{412}$ of the chamber wall 412.

The chamber wall 412 defines an outer perimeter of the mold chamber 408, whereby the chamber wall 412 is continuous and completely surrounds the mold chamber 408. As explained below, the distal end 428 of the chamber wall 412 is configured to interface with components 500, 502 for forming the bladder 300 during assembly of the bladder 300. In some examples, the distal end 428 is substantially planar, whereby the height of the chamber wall 412 is constant. In other examples, a profile of the distal end 428 may be contoured. For example, the distal end 428 may be concave across the width $W_{412}$ to form a channel extending along a length of the chamber wall 412.

With continued reference to FIG. 4A, the cavity wall 414 of the platen 406 extends from a first end 434 at the inner surface 418 of the base 410 to a distal end 436 at the opposite end of the cavity wall 414 from the first end 434. A distance from the inner surface 418 of the base 410 to the distal end 436 of the cavity wall 414 defines a height $H_{414}$ of the cavity wall 414. As shown, the height $H_{414}$ of the cavity wall 414 is greater than the height $H_{412}$ of the chamber wall 412. The cavity wall 414 further includes an opposing pair of side surfaces 438 extending from the inner surface 418 of the base 410 to the distal end 436. A distance between the side surfaces 438 defines a width $W_{414}$ of the cavity wall 414.

In the illustrated example, the cavity wall 414 includes a peripheral portion 414a and one or more interior portions 414b. The peripheral portion 414a of the cavity wall 414 is spaced inwardly from the chamber wall 412 to define a transitional cavity 417 between chamber wall 412 and the cavity wall 414. The distal end 436 of the peripheral portion 414a is continuously formed and is configured to form the peripheral seam 304 around the perimeter of the formed bladder 300, as described in greater detail below. Accordingly, a path along which a length of the peripheral portion 414a extends corresponds to a desired peripheral shape of the bladder 300.

The interior portions 414b of the cavity wall 414 extend inwardly (i.e., in an opposite direction from the chamber wall 412) from the peripheral portion 414a of the cavity wall 414, and cooperate with the peripheral portion 414a to define the profiles of individual ones of the mold cavities 416. As discussed below, the interior portions 414b of the cavity wall 414 correspond to the desired locations of interior bonds 306 of the bladder 300. Accordingly, the arrangement (i.e., size, shape, location) of the interior portions 414b is selected based on a desired shapes of the chambers 310 of the bladder 300.

In some examples, the distal end 436 of the interior portions 414b of the cavity wall 414 extend continuously between the peripheral portion 414a of the cavity wall 414, whereby the resulting interior bonds 306 also extend continuously between the first and second portions of the peripheral seam 304 of the bladder 300. Thus, adjacent ones of the chambers 310 defined by the respective interior portions 414b of the cavity wall 414 may be fluidly isolated from each other after the bladder 300 is formed, such as the chambers 310f of the second bladder 300b (see FIG. 3). In some examples, the interior portions 414b of the cavity wall 414 may be discontinuous, or include one or more notches 440 formed in the distal end 436 that extend continuously across the entire width $W_{414}$ of the interior portion 414a (see FIG. 4B). These notches 440 allow fluid communication between adjacent mold cavities 416 when the platens 406 of the mold 402 are in a closed position, and result in the formation of conduits 312 that extend between the interior bonds 306 and fluidly connect adjacent ones of the chambers 310 to each other.

The chamber walls 414 of each platen 406 are operable to bond the barrier layers 302 of the bladder 300 together at discrete locations to define the interior void 308 and the chambers 310. Particularly, the distal ends 436 of the cavity walls 414 provide energy to the barrier layers 302 to bond the barrier layers 302 to each other when the barrier layers 302 are compressed between opposing distal ends 436 of respective platens 406. In the illustrated example, the distal ends 436 of the cavity walls 414 are configured for radio frequency (RF) welding such that when the barrier layers 302 are compressed between the distal ends 436 of cavity wall 414, high-frequency radio waves are supplied to the barrier layers 302 and the barrier layers 302 are welded together between the distal ends 436 to form the peripheral seam 304 and the interior bonds 306. In other examples, the cavity walls 414 may be configured for thermally bonding (i.e., melding) the barrier layers 302 together with each other. For example, the cavity walls 414 may have one or more elements for heating the distal ends 436 above a desired temperature for melding material(s) of the barrier layers 302 together.

Figure 4B:
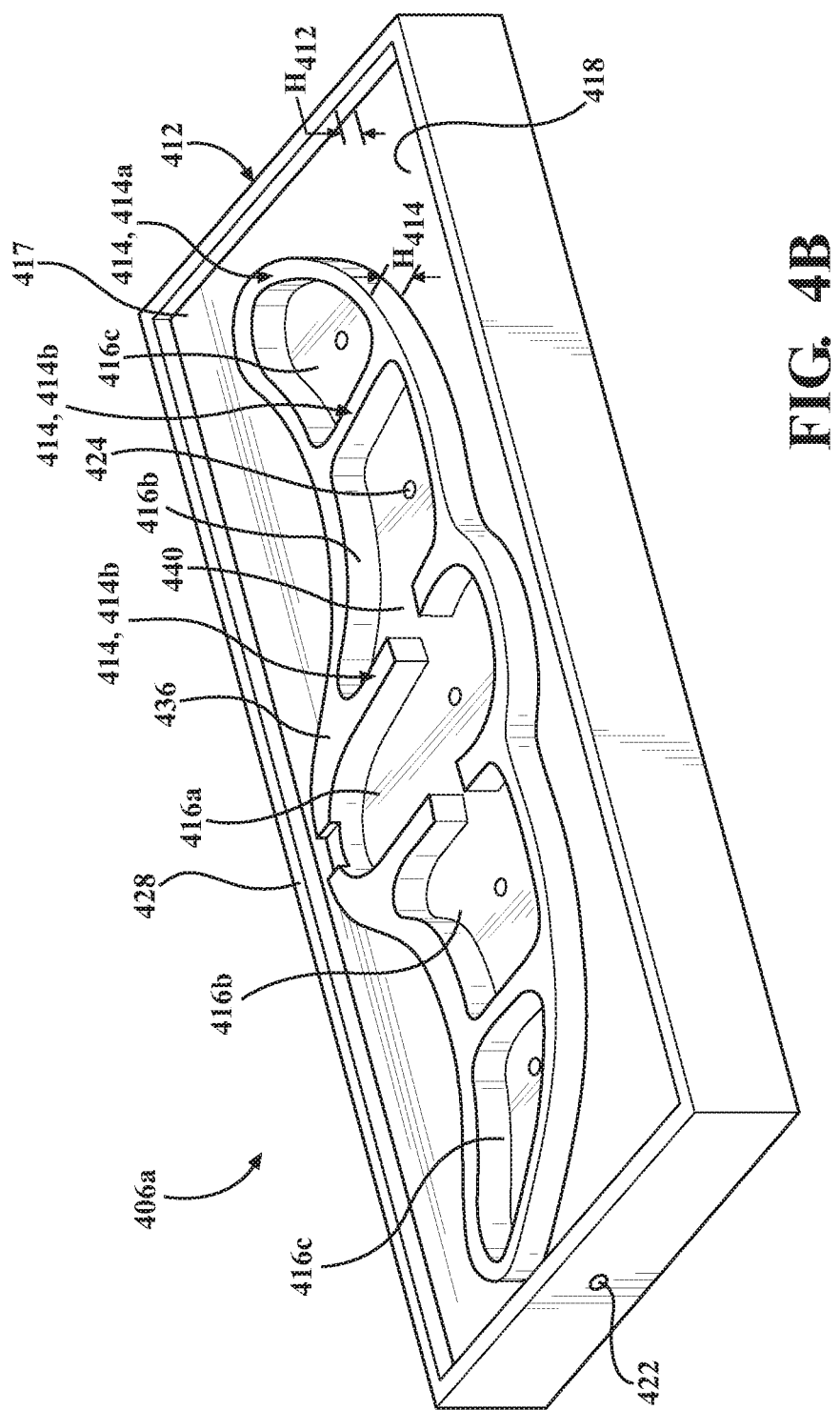
FIG. 4B is a perspective view of an example of a mold platen of the system of FIG. 4A, configured to form the bladder shown in FIG. 3.

Referring to FIG. 4B, an example of a platen 406a configured for forming the second bladder 300b is shown. The platen 406a is formed using the same principles as the generic platen 406 described above, wherein the chamber wall 412 has a first height $H_{412}$ and the cavity wall 414 has a second height $H_{414}$ that is greater than the first height $H_{412}$. In the illustrated example, the cavity wall 414 is configured to define uniquely shaped cavities 416a-416c corresponding to the shapes of the chambers 310d-310f of the second bladder 300b. As discussed above, the interior portions 414b of the cavity wall 414 may extend continuously between opposing portions of the peripheral portion 414a of the cavity wall 414 to form isolated cavities 416c corresponding to the isolated chambers 310f of the second bladder 300b. Alternatively, interior portions 414b of the cavity wall 414 may include one or more notches 440 formed therein for forming conduits 312 between the fluidly-coupled chambers 310d, 310e.

Referring now to FIGS. 5A-5E, a method or process for using the system 400 to form a generic example of a bladder 300 according to the principles of the present disclosure is provided. Generally, the system 400 is provided with a first sheet 500 of material and a second sheet 500 of material corresponding to the barrier layers 302 of the formed bladder 300. Each sheet 500 includes an inner surface 504 and an outer surface 506 disposed on an opposite side of the sheet 500 from the inner surface 504. A distance between the inner surface 504 and the outer surface 506 defines a thickness of the sheet 500. As discussed above, the material of the sheets 500 includes one or more thermoplastic polymers and/or one or more cross-linkable polymers.

As described in greater detail below, a gasket 502 is configured to be disposed between opposing distal ends 428 of the chamber wall 412 when the mold 402 is moved to a closed position. Accordingly, a length of the gasket 502 extends along a path corresponding to a length of the distal end 428 of the chamber wall 412. The gasket 502 includes a pair of sealing surfaces 508 formed on opposite sides of the gasket 502, whereby a distance from one sealing surface 508 to the other sealing surface 508 defines a thickness $T_{502}$ of the gasket 502. The gasket 502 further includes an inner peripheral surface 510 and an outer peripheral surface 512, each extending between the sealing surfaces 508 on opposite sides of the gasket 502. One or more conduits 514 are formed through the gasket 502 from the inner peripheral surface 510 to the outer peripheral surface 512.

Figure 5A:
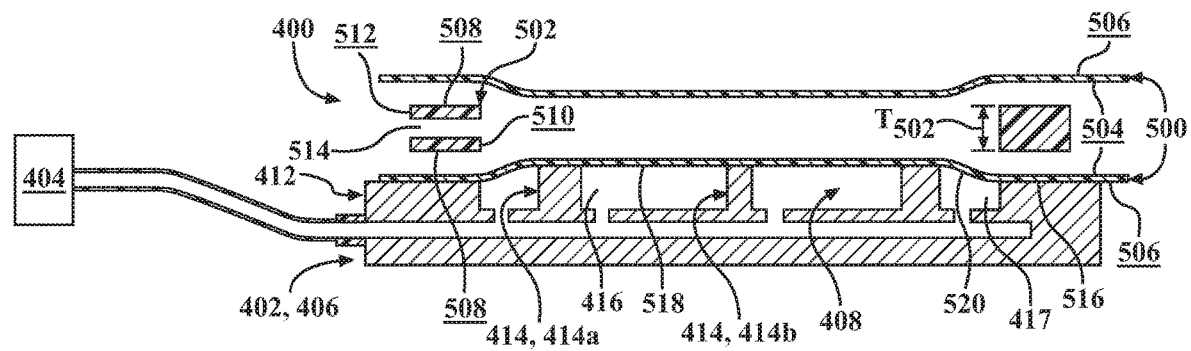
FIGS. 5A-5G are cross-sectional views of a system according to the present disclosure, showing steps of a method of using the system to form a bladder according to the principles of the present disclosure.

In an initial step, shown in FIG. 5A, the mold 402 is provided in a fully-opened position. Here, a first platen 406 is provided as a lower platen 406 so that the components 500, 502 for forming the bladder 300 can be provided to the mold 402. As shown, a first one of the sheets 500 of material is laid atop the chamber wall 412 and covers the mold chamber 408. The lower sheet 500 may be described as having a peripheral region 516 disposed on and supported by the chamber wall 412, and an inner region 518 surrounded by the peripheral region 516 and supported by the cavity wall 414. Because the height $H_{414}$ of the cavity wall 414 is greater than the height $H_{412}$ of the chamber wall 412, the inner region 518 may be vertically offset from the peripheral region 516. Accordingly, the lower sheet 500 may also have a transition region 520 extending between the peripheral region 516 and the inner region 518.

Figure 5B:
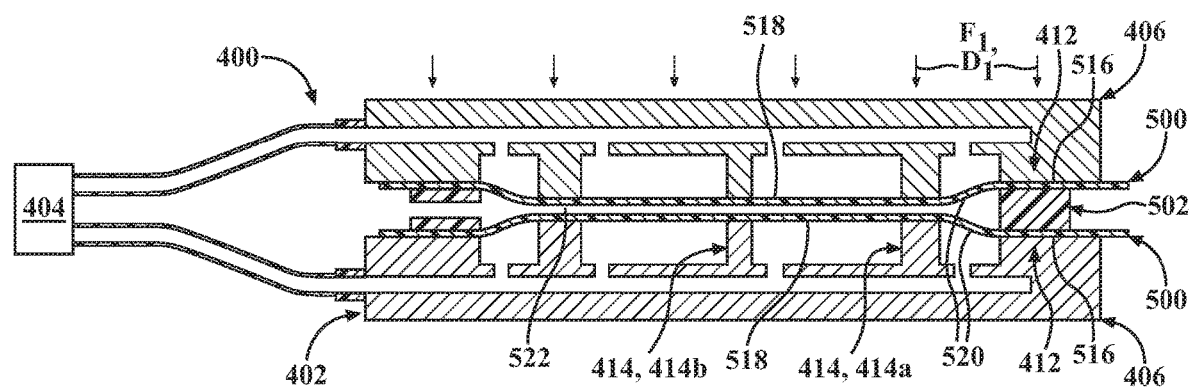

As shown in FIGS. 5A and 5B, the transition region 520 of the lower sheet 500 may span the transitional cavity 417 that separates the chamber wall 412 from the peripheral portion 414a of the cavity wall 414. As explained in greater detail below, the transitional cavities 417 of the platens 406 are configured to accommodate flexure and expansion of the sheets 500 during manufacturing of the bladder 300, but are not associated with forming a chamber 310 of the completed bladder 300.

With the first one of the sheets 500 in place atop the lower platen 406, the gasket 502 is disposed on the sheet 500 so that a bottom one of the sealing surfaces 508 is in contact with the inner surface 504 of the first sheet 500 along the peripheral region 516. Thus, the gasket 502 is also supported on the distal end 428 of the chamber wall 412 and surrounds the inner region 518 and the transition region 520 of the first sheet 500. When the gasket 502 is in a natural, uncompressed state, the gasket 502 will have a first thickness $T_{502}$ and the conduit 514 formed through the gasket 502 will be unrestricted.

With the gasket 502 in place, a second, upper sheet 500 is placed in the mold 402. As shown in FIG. 5B, the inner surface 504 of the upper sheet 500 contacts the upper sealing surface 508 of the gasket 502 in the peripheral region 516 of the upper sheet 500, while the inner surface 504 of the upper sheet 500 faces the inner surface 504 of the lower sheet 500 in the inner region 518.

Referring now to FIG. 5B, once all of the components 500, 502 are positioned within the mold 402, the mold 402 is moved to a first position by moving the platens 406 towards each other, as indicated by the arrows $D_1$. In the first position, a preload force $F_1$ is applied to the components 500, 502 by the mold plates 402 such that the peripheral region 516 of the lower sheet 500, the gasket 502, and the peripheral region 516 of the upper sheet 500 are compressed between the opposing distal ends 428 of the chamber walls 412 of the respective platens 406, thereby sealing the sheets 500 and the gasket 502 between the chamber walls 412. Here, the preload force $F_1$ is sufficient to form a seal between the sealing surfaces 508 of the gasket and the respective inner surfaces 504 of the sheets, while maintaining the conduit 514 of the gasket 502 in a substantially decompressed state.

Referring still to FIG. 5B, in the first position, the inner regions 518 of the sheets 500 will not be compressed by the distal ends 436 of the cavity wall 414. Accordingly, the inner surfaces 504 of the sheets 500 can be separated from each other to form a space 522 between the inner regions 518 of the sheets 500. Particularly, the sheets 500 are separated from each other by the space 522 between the distal ends 436 of the cavity wall 414 to allow for fluid to pass freely through the space 522 from one cavity 416 to another during the vacuum forming step of FIG. 5C.

Figure 5C:
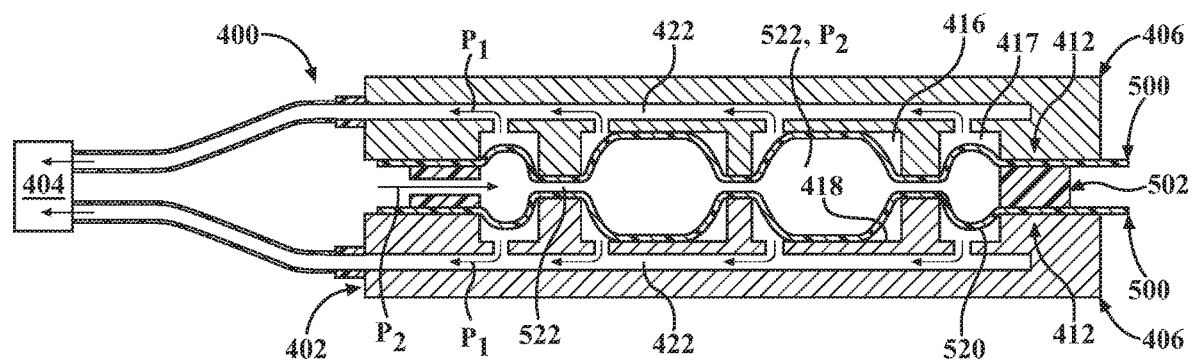

Turning now to FIG. 5C, when the mold is in the first position and the peripheral regions 516 of the sheets 500 are sealed against the gasket 502, the vacuum source 404 is activated to provide a negative first pressure $P_1$ within the manifolds 422 of each of the platens 406. The first pressure $P_1$ may be any pressure that is less than a second pressure $P_2$ within the space 522 between the sheets 500. In the illustrated example, the second pressure $P_2$ within the space 522 is atmospheric or ambient pressure and the first pressure $P_1$ is a negative pressure relative to atmospheric pressure. However, as discussed below, in some examples, the space 522 may be pressurized with a positive pressure (i.e., greater than atmospheric). The first pressure $P_1$ is communicated to each of the cavities 416, 417 of the mold 402 through respective ones of the ports 424. Consequently, the pressure differential between the first pressure $P_1$ within the cavities 416 and the second pressure $P_2$ within the space 522 causes the sheets 500 to be drawn towards surfaces 418, 430, 438 defining each of the cavities 416, 417.

Here, the magnitude of the first pressure $P_1$ determines the amount that each sheet 500 is drawn into the cavities 416 of the mold 402 and, ultimately, the shape and pressure of the chambers 310 of the bladder 300. As discussed above, the sheets 500 that form the barrier layers 302 of the bladder 300 include an elastomeric material. Accordingly, when the first pressure $P_1$ is provided within the cavities 416 of the mold 402, the sheets 500 are drawn into the cavities 416 by an amount corresponding to the magnitude of the first pressure $P_1$. For example, a first pressure $P_1$ having a greater magnitude will draw the sheets farther into the mold cavities 416 by stretching the sheets 500 to a greater degree. In the example of FIG. 5C, the magnitude of the first pressure $P_1$ is sufficient to draw the outer surfaces 506 of the sheets 500 against the surfaces 418, 438 defining the mold cavities 416. However, as discussed below, in other examples, the magnitude of the first pressure $P_1$ may be different, such that the sheets 500 are not stretched against the surfaces 418, 438 of the mold 402.

As the sheets 500 are drawn into the cavities 416 by the first pressure $P_1$, fluid, such as air and/or nitrogen, flows into the space 522 between the sheets 500 through the conduit 514 formed through the gasket 502. Accordingly, a volume of the space 522 is able to increase without causing the second pressure $P_2$ within the space 522 to decrease, thereby allowing the chambers 310 of the bladder 300 to be formed within each of the cavities 416. In the illustrated example, the conduit 514 is in communication with atmospheric pressure, whereby the second pressure $P_2$ will remain substantially equal to atmospheric pressure as the chambers 310 are formed. However, in other examples, the conduit 514 may be in communication with a positive pressure source, such as a pump (not shown), whereby the pressure within the space 522 is greater than atmospheric pressure.

With continued reference to FIG. 5C, the first pressure $P_1$ may also be applied to the transitional cavities 417, thereby drawing the transition regions 520 of the sheets 500 into the transitional cavities 417. In some examples, the transitional cavities 417 may not be in communication with the vacuum source 404, and may simply provide spaces for flexure of the transition regions 520 of the sheets 500 when the mold 402 is moved between positions. Although the transitional regions 520 of the sheets 500 are not formed into chambers 310 of the bladder 300, allowing the transition regions 520 to flex and move within the transitional cavities 417 may accommodate expansion and shifting of the sheets 500 during the vacuum forming step.

Figure 5D:
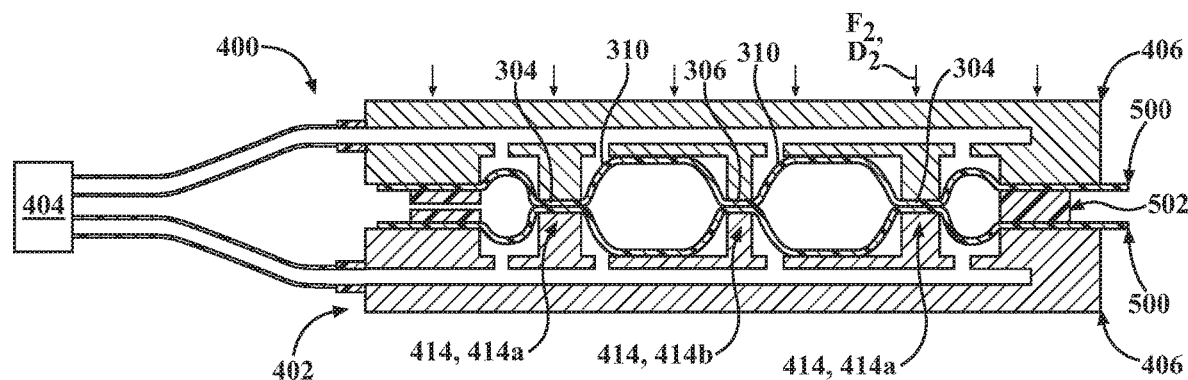

Referring to FIG. 5D, once the inner regions 518 of the sheets 500 are drawn into the cavities 416, thereby forming the shapes of the chambers 310 of the bladder 300, the mold 402 is moved to a second position to seal the inner surfaces 504 of the sheets 500 together, as indicated by the directional arrows $D_2$. In the second position, a sealing force $F_2$ is applied to the components 500, 502 of the mold such that the inner regions 518 of the sheets 500 are compressed together by the opposing distal ends 428 of the cavity walls 414 to seal the interior void 308 of each chamber 310. The sealing force $F_2$ is greater than the preload force $F_1$. For example, the sealing force $F_2$ may be approximately 1000 pounds-force (4448 Newtons) while the preload force is approximately 50 pounds-force (222 Newtons). Under the sealing force $F_2$, the peripheral portions 414a of the cavity walls 414 seal a portion of the inner region 518 corresponding to the peripheral seam 304 of the bladder 300, while the interior portions 414b of the cavity wall 414 seal portions of the inner region 518 corresponding to the interior bonds 306 of the bladder 300.

Figure 5E:
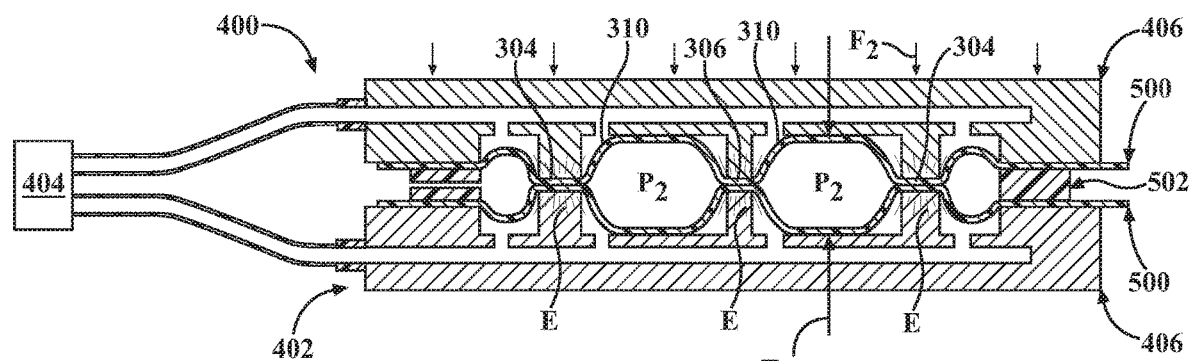

As shown in FIG. 5E, with the chambers 310 formed and the inner regions 518 of the sheets 500 sealed between the cavity walls 414, energy E is provided to the distal ends 428 of the cavity wall 414 to bond the compressed regions of the sheets 500 together, thereby forming the peripheral seam 304 and the interior bonds 306 of the bladder 300. As discussed above, the energy E provided to the distal ends 428 of the cavity wall 414 may be high frequency electromagnetic energy for radio-frequency (RF) welding the sheets 500 together. In other examples, the energy E may be a thermal energy, whereby the sheets 500 are melded together at the peripheral seam 304 and the interior bonds 306.

Figure 5F:
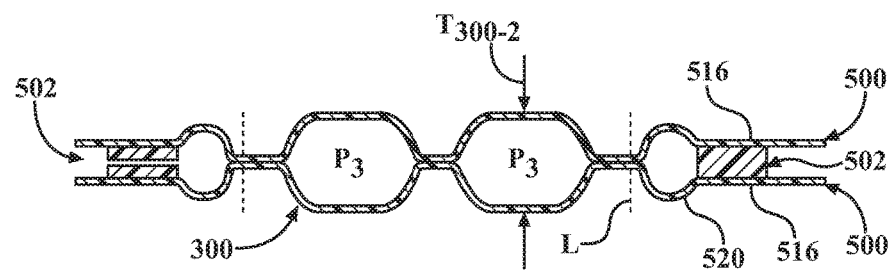

At FIG. 5F, the molded components 500, 502, which include the formed bladder 300, are removed from the mold 402 for post-processing. As discussed above, during the mold process a first pressure $P_1$ is applied to the outer surfaces 506 of the elastomeric sheets 500 to draw the sheets 500 into the mold cavities 416. The first pressure $P_1$ is maintained on the sheets 500 while the sheets 500 are formed into barrier layers 302 of the bladder 300, such that the second pressure $P_2$ within the space 522 between the sheets 500 is sealed within the interior voids 308 of the chambers 310 while the sheets 500 are in a stretched state (i.e., the bladder has a first thickness $T_{300-1}$ in the mold). Upon removal of the molded bladder 300 from the mold 402, the first pressure $P_1$ is released and the elasticity of the material forming the sheets 500 may cause the sheets (now barrier layers 302) to contract (i.e., the bladder 300 has a second thickness $T_{300-2}$ when removed from the mold).

Upon contraction, the fluid within the interior voids 308 of the chambers 310 is compressed by the sheets 500, such that the pressure of the fluid may increase from the second pressure $P_2$ to a third pressure $P_3$. The magnitude of the pressure increase in the interior void 308 is directly related to the strain imparted on the sheets 500 by the first pressure $P_1$, as well as the modulus of elasticity of the material forming the sheets. For example, where the sheets 500 are formed of an inelastic material, the pressure increase may be negligible as the sheets 500 remain in the stretched state upon release of the negative pressure. However, for materials having a relatively low modulus of elasticity, applying a greater first pressure $P_1$ to the sheets 500 causes increased strain in the elastomeric material during the molding process, which results in a greater pressure increase within the interior void 308 when the first pressure $P_1$ is released and the material contracts.

Figure 5G:
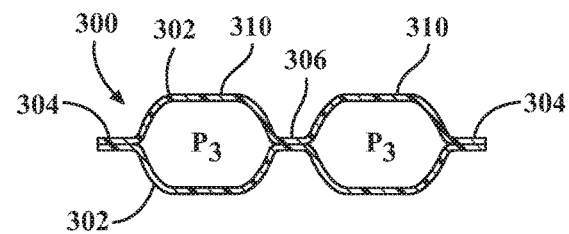

With continued reference to FIGS. 5F and 5G, the bladder 300 is finished by trimming the sheets 500 at the cut line L along the peripheral seam 304 to separate the peripheral regions 516 of the sheets 500 and the gasket 502 from the formed bladder 300. Because the gasket 502 and the peripheral regions 516 of the sheets 500 are not bonded to each other during the molding process, the gasket 502 can be separated from the trimmed peripheral portions 516 of the sheets 500 for reuse in subsequent molding operations.

Figure 6A:
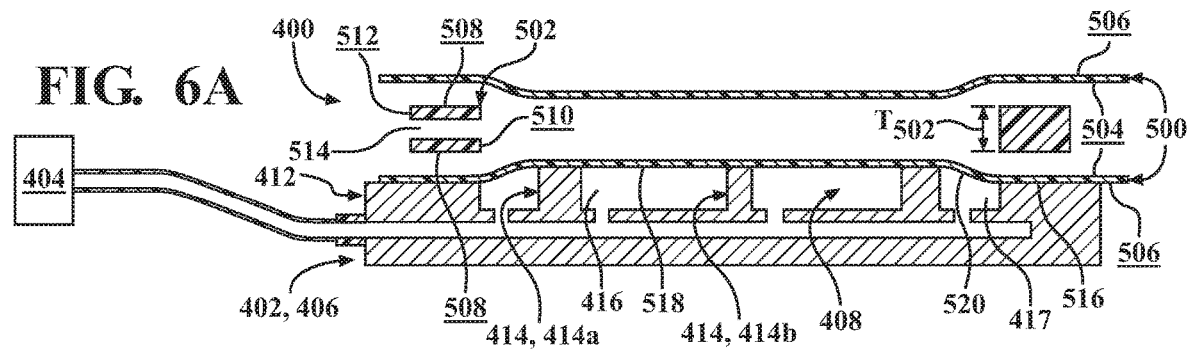
FIGS. 6A-6G are cross-sectional views of a system according to the present disclosure, showing steps of a method of using the system to form a bladder according to the principles of the present disclosure.
Figure 6B:
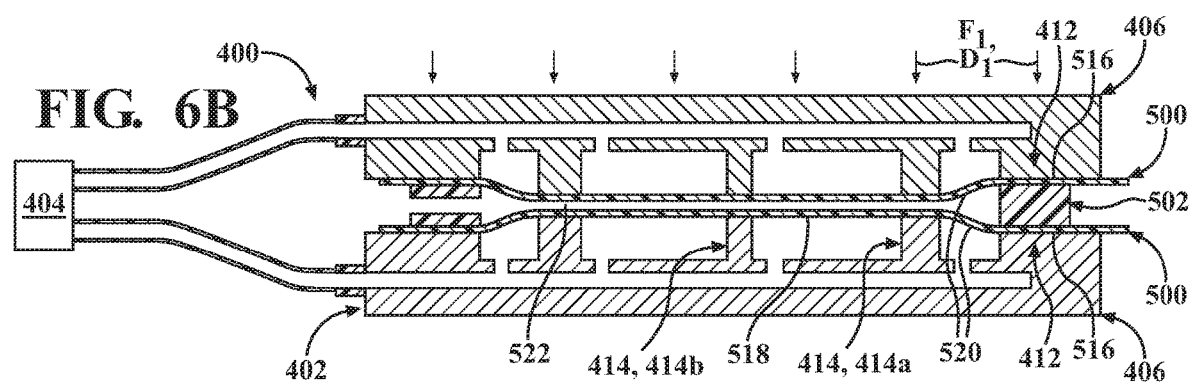
Figure 6C:
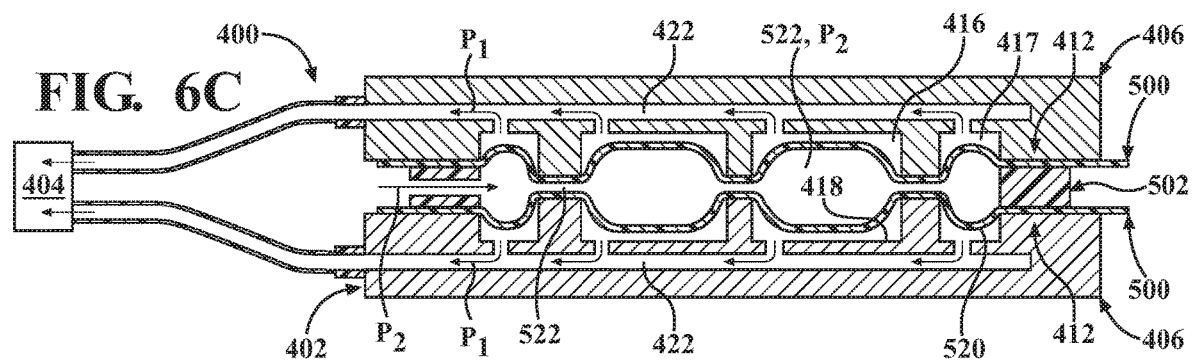
Figure 6D:
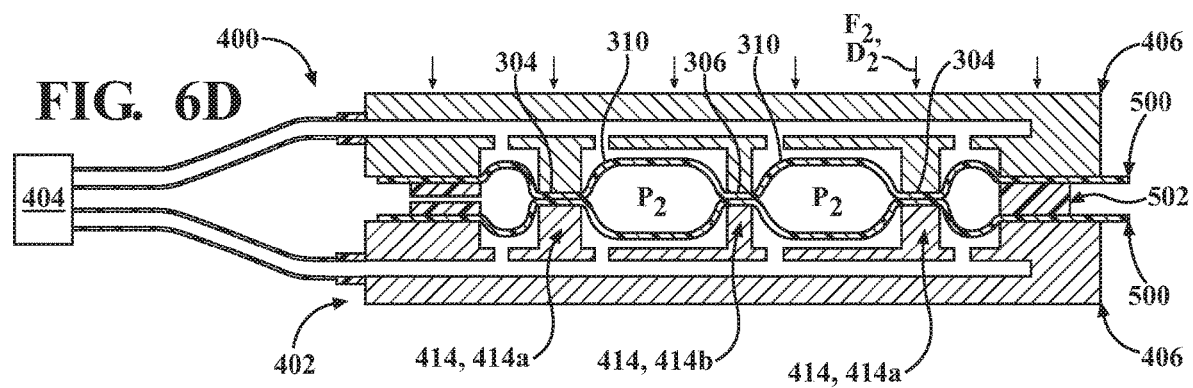
Figure 6E:
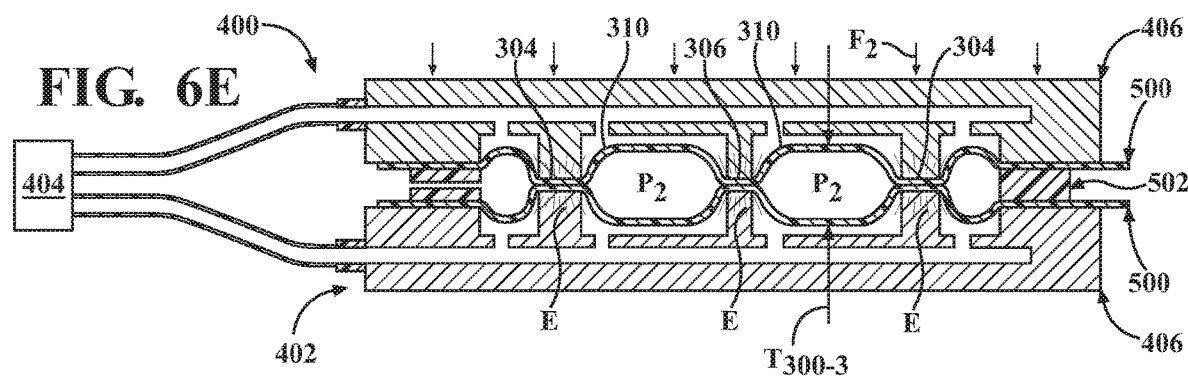
Figure 6F:
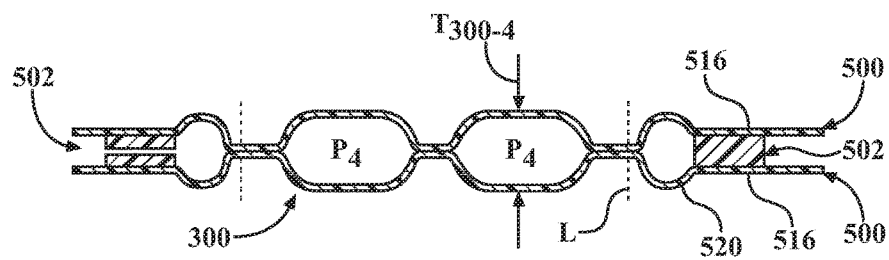
Figure 6G:
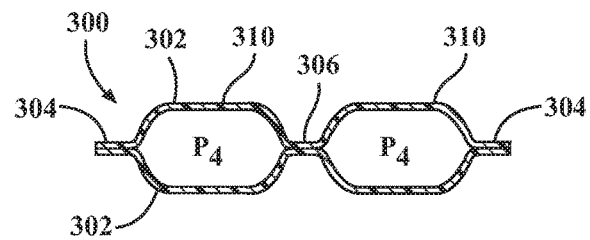

With particular reference to FIGS. 6A-6G, another method for using the system 400 to form an example of a bladder 300 according to the principles of the present disclosure is provided. The method illustrated in FIGS. 6A-6G is substantially similar to the method discussed above with respect to FIGS. 5A-5G. However, in this example, the first pressure $P_1$ has a lower magnitude than in the example above, such that the sheets 500 are not fully drawn into the cavities 416 of the mold 402. As discussed above, applying a first pressure $P_1$ of a lower magnitude to the mold cavities 416 ultimately results in a bladder 300 having an interior void 308 with a pressure $P_4$ that is less than the pressure $P_3$ of the bladders 300 formed using a first pressure $P_1$ of greater magnitude. Thus, as shown in FIG. 6C, where a bladder 300 having a lower internal pressure is desired, the sheets 500 may only be drawn partially into the cavities 416 (i.e., the bladder has a third thickness $T_{300-3}$ in the mold). When the first pressure $P_1$ is released, the material of the sheets 500 will contract (i.e., the bladder 300 has a fourth thickness $T_{300-4}$ when removed from the mold) to provide the interior void 308 with a positive fourth pressure $P_4$ that is less than the positive third pressure $P_3$ of the example in FIG. 5G.

With particular reference to FIGS. 7A-7G, another method for using a system 400a to form an example of a bladder 300 according to the principles of the present disclosure is provided. In view of the substantial similarity in structure and function of the components associated with the system 400 with respect to the system 400a, like reference numerals are used hereinafter and in the drawings to identify like components while like reference numerals containing letter extensions are used to identify those components that have been modified.

The method of FIGS. 7A-7G utilizes a substantially similar system 400a and process as discussed above with respect to the system 400 and method of FIGS. 5A-5G. However, in addition to the mold 402 and the vacuum source 404, the system 400 includes a positive pressure source 450 configured to provide a fluid having a positive second pressure $P_2$ (i.e., greater than ambient pressure) to the space 522 between the sheets 500. In the illustrated example, the pressure source 450 is embodied as a tank or vessel. However, in other examples, the pressure source 450 may be a pump or compressor configured to constantly provide the positive second pressure $P_2$.

Figure 7A:
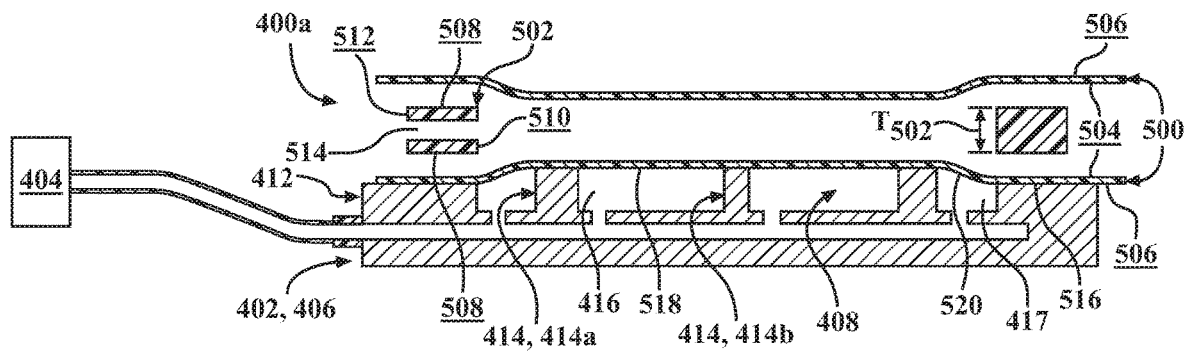
FIGS. 7A-7G are cross-sectional views of a system according to the present disclosure, showing steps of a method of using the system to form a bladder according to the principles of the present disclosure.
Figure 7B:
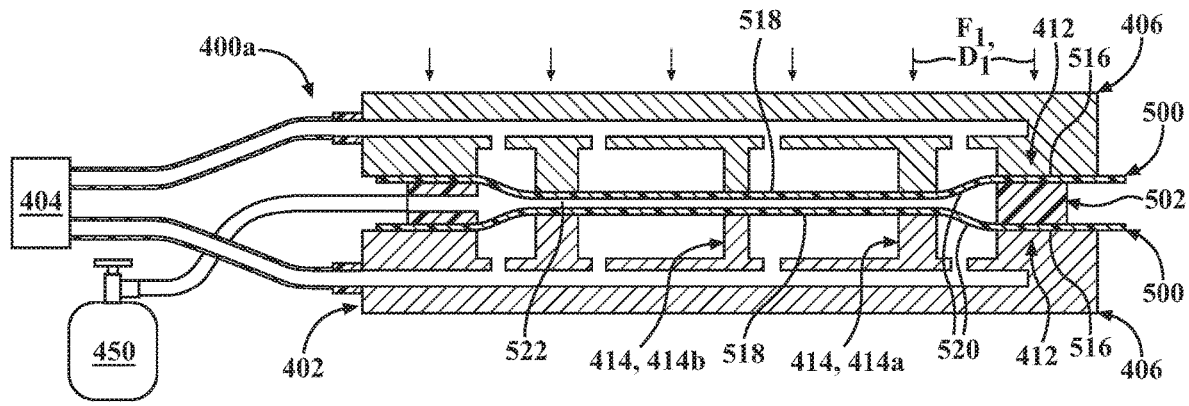
Figure 7C:
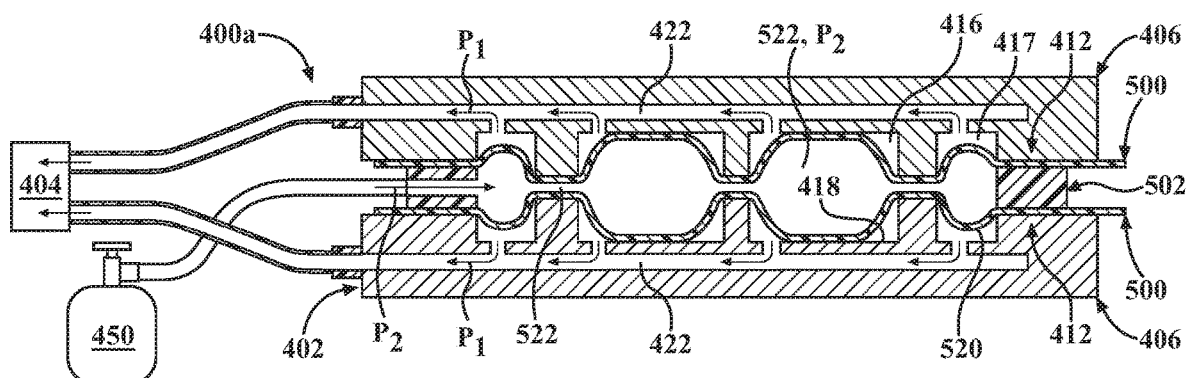
Figure 7D:
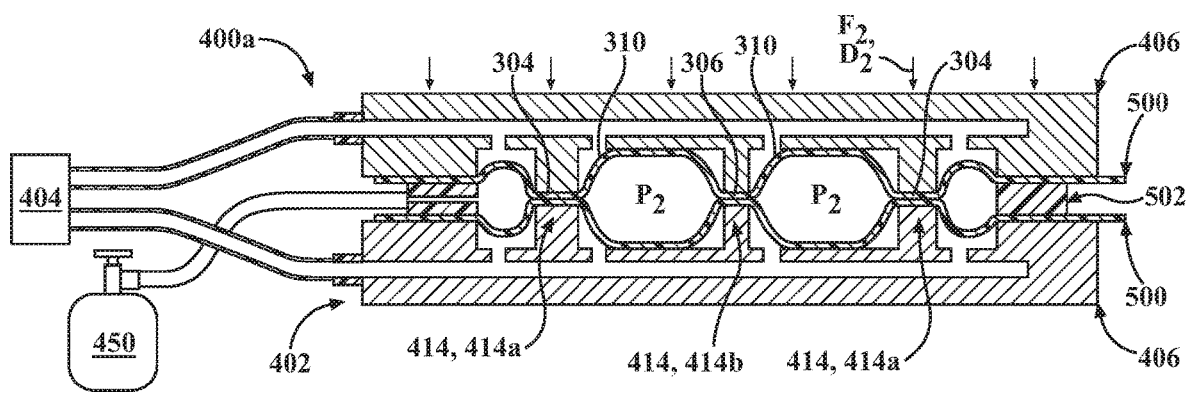
Figure 7E:
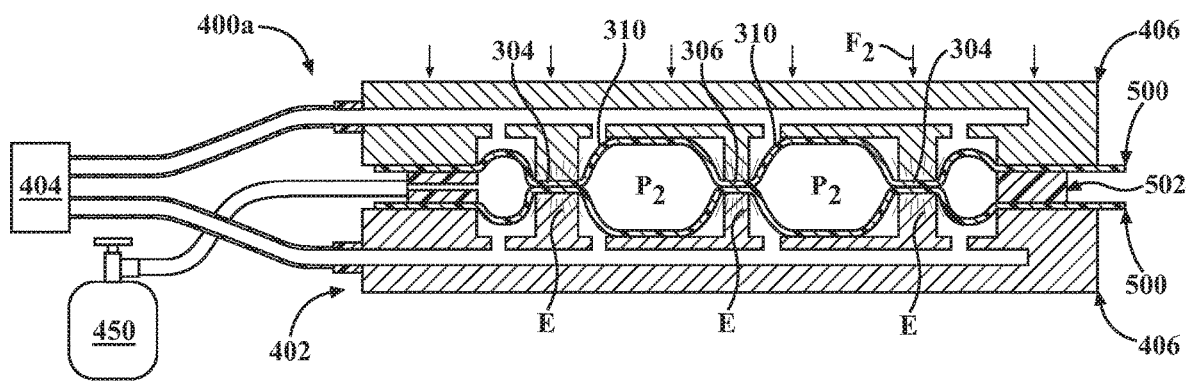
Figure 7F:
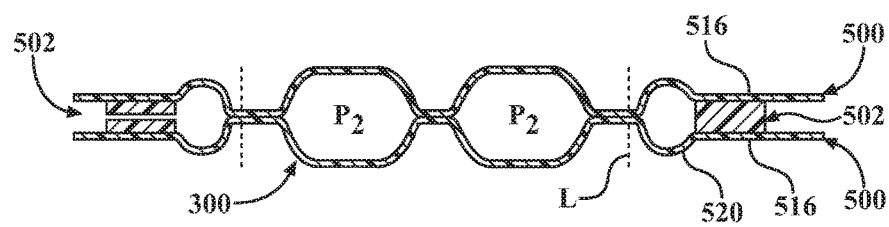
Figure 7G:
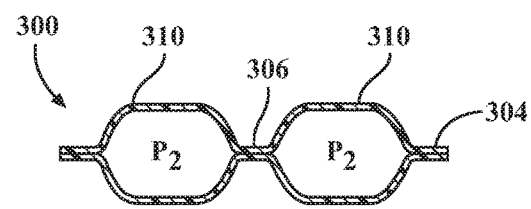

In some examples, the positive second pressure $P_2$ is provided to the space 522 in the form of a pressurized fluid, such as nitrogen gas, in the range of 4 psi (27.57 kPA) to 8 psi (55.16 kPA). Accordingly, each of the chambers 310 will be pressurized at the positive second pressure $P_2$. In some examples, the positive second pressure $P_2$ may be provided to the space 322 from the pressure source 450 at the same time the negative first pressure $P_1$ is drawn on the exterior of the sheets 500 by the vacuum source 404, as shown in FIG. 7C. Here, the negative first pressure $P_1$ and the positive second pressure $P_2$ work in unison to form the chambers 310 within the mold cavities 416. Alternatively, the vacuum source 404 may be deactivated or removed such that the manifold 422 is at ambient pressure while the space 522 is at the positive second pressure $P_2$. Here, the positive second pressure $P_2$ acts alone to shape the chambers 310 within the mold cavities 416.

With particular reference to FIGS. 8A-8H, another method of using a system 400b to form an example of a bladder 300c according to the principles of the present disclosure is provided. In this example, the bladder 300c is formed for incorporation into a sole structure 200a of an article of footwear 10a (FIG. 10). Here, one of the barrier layers 302a of the bladder 300c is configured to form a portion of an outsole 202a of the sole structure 200a. Accordingly, unlike the examples described above, where the bladder 300 is primarily used as a cushioning element and is formed using two substantially planar sheets 500 of an elastomeric film, the bladder 300c of the current example is formed with one sheet in the form of a pre-molded outsole component 500a.

Figure 8A:
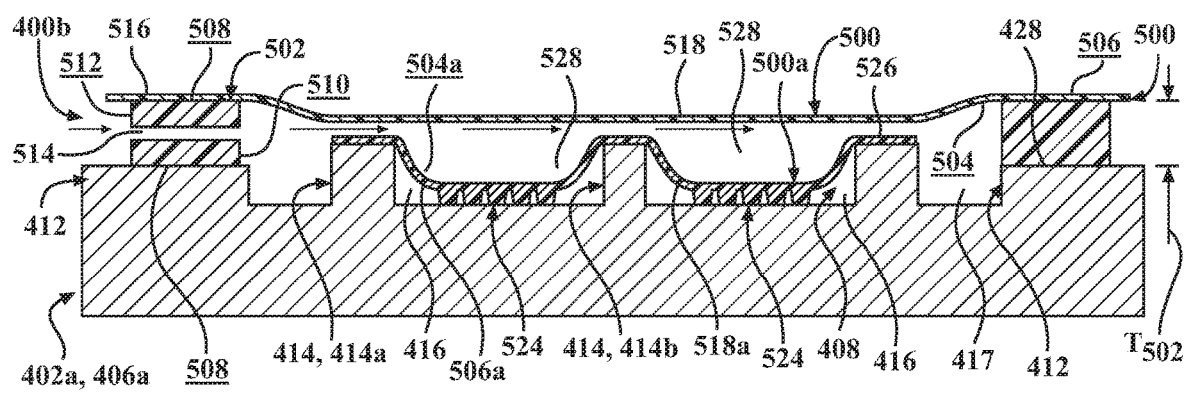
FIGS. 8A-8H are cross-sectional views of a system according to the present disclosure, showing steps of a method of using the system to form a bladder according to the principles of the present disclosure.
Figures 9, 10:
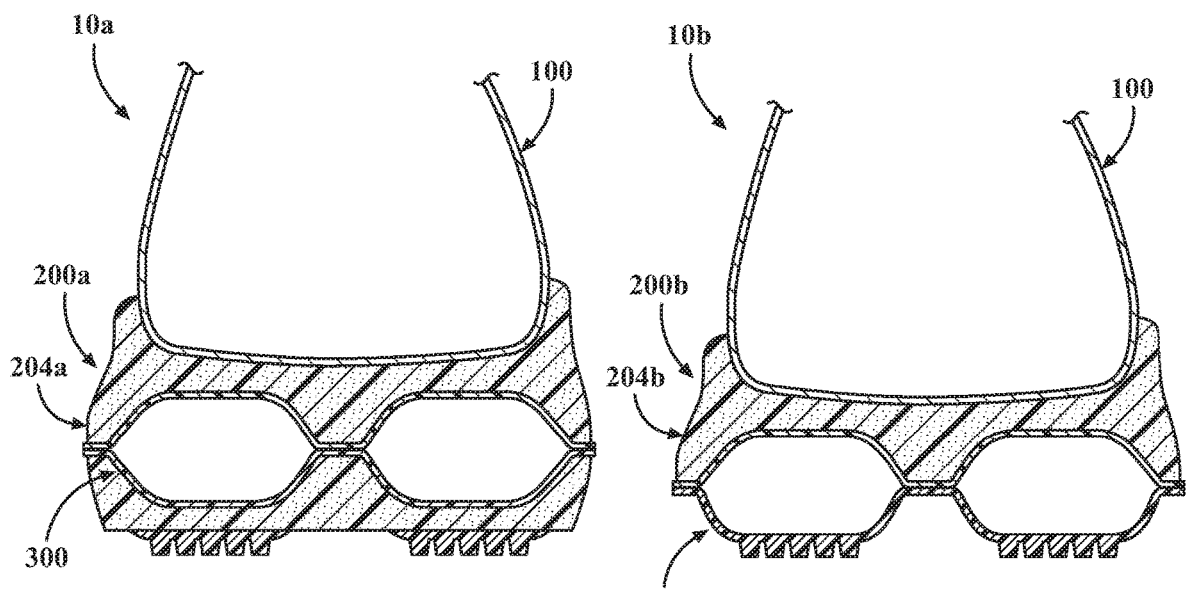
FIG. 9 is a cross-sectional view of an article of footwear including a bladder formed using the methods of FIGS. 5A-7G.
FIG. 10 is a cross-sectional view of an article of footwear including a bladder formed using the method of FIGS. 8A-8G.

With reference to FIG. 8A, in an initial step, the mold 402a is provided in a fully-opened position. Here, a first platen 406a is provided as a lower platen 406a so that the components 500, 500a, 502 for forming the bladder 300a can be provided to the mold 402a. As provided above, in this example the outsole component 500a is provided in place of a bottom sheet 500. Here, the outsole component 500a is pre-formed with the desired geometry of the finished bladder 300a prior to insertion into the mold 402a. The outsole component 500a is formed of a polymeric material capable of melding with the material of the sheet 500 forming the opposing barrier layer 302. The outsole component 500a may be formed of one or more polymeric materials using known molding processes, such as injection molding or a separate vacuum forming process.

An inner region 518a of the outsole component 500a is pre-formed to include one or more pods 524 corresponding to lower portions of the chambers 310c of the bladder 300c. As shown, each of the pods 524 is formed to fit within the mold cavities 416 of the lower mold platen 406a, between the cavity walls 414, while a peripheral portion 526 of the outsole component 500a rests upon the distal end 436 of the cavity wall 414.

As with the sheets 500, the outsole component 500a may be described as including an inner surface 504a and an outer surface 506a formed on an opposite side of the outsole component 500a from the inner surface 504a. Each of the pods 524 includes a recess 528 defined by a portion of the inner surface 504a associated with each pod 524. As described in greater detail below, when the upper sheet 500 is formed in the mold 402a, the recesses 528 of the pods 524 cooperate with the upper sheet 500 to enclose the interior void 308 of the bladder 300c.

With continued reference to FIG. 8A, each of the pods 524 further includes one or more traction elements 530 formed on the outer surface 506a of the outsole component 500a. The traction elements 530 are configured to form a portion of the ground-engaging surface 26 of a sole structure 200b. In some instances, the traction elements 530 are formed by portions of the outsole component 500a having an increased thickness (i.e., distance between inner surface 504a and outer surface 506a).

In the illustrated example, the traction elements 530 are formed integrally with the outsole component 500a, such that the entire outsole component 500a is formed of the same material. In some examples, portions of the outsole component 500a, such as the traction elements 530, may be formed of different materials. For example, the traction elements 530 may include materials having different properties than the remainder of the outsole component 500a, such as abrasion resistance, friction, and/or hardness. Here, the traction elements 530 formed of a second material may be placed within a mold prior to an outsole component molding process (e.g., injection molding), such that when the first material forming the outsole component 500a is provided to the mold cavity, the second material is at least partially encapsulated within the first material to form a composite structure including the traction elements 530.

With continued reference to FIG. 8A, with the outsole component 500a in place within the lower platen 406a, the gasket 502 is positioned within the mold 402a. Unlike the examples above, where a peripheral region 516 of a bottom sheet 500 is supported by the chamber wall 412, in the current example, the outsole component 500a is provided without a peripheral region 516. Accordingly, the distal end 428 of the chamber wall 412 is not covered by the outsole component 500a. As such, when the gasket 502 is positioned within the mold 402a, a bottom one of the sealing surfaces 508 contacts the distal end 428 of the chamber wall 412 such that the gasket 502 is directly supported on the chamber wall 412.

With the gasket 502 in place, an upper sheet 500 is placed in the mold 402a. As shown, the inner surface 504 of the upper sheet 500 contacts the upper sealing surface 508 of the gasket 502 in the peripheral region 516 of the upper sheet 500, while the inner surface 504 of the upper sheet 500 faces the inner surface 504a of the outsole component 500a in the inner region 518. When the gasket 502 is in a natural, uncompressed state, the gasket 502 will have a first thickness $T_{502}$ and the conduit 514 formed through the gasket 502 will be unrestricted.

Figure 8B:
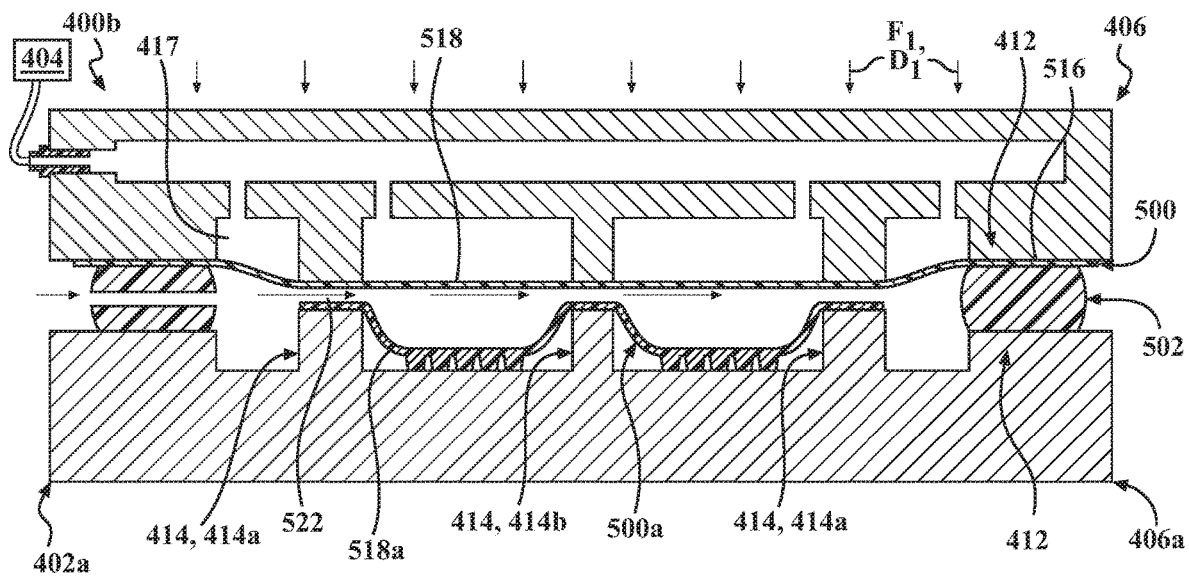

Referring now to FIG. 8B, once all of the components 500, 500a, 502 are positioned within the mold 402a, the mold 402a is moved to a first position by moving the platens 406, 406a towards each other, as indicated by the arrows $D_1$. In the first position, a preload force $F_1$ is applied to the components 500, 500a, 502 by the mold plates 402a such that the gasket 502 and the peripheral region 516 of the upper sheet 500 are compressed between the opposing distal ends 428 of the chamber walls 412 of the respective platens 406, 406a, thereby sealing the upper sheet 500 and the gasket 502 between the chamber walls 412.

Referring still to FIG. 8B, in the first position, the inner region 518a of the outsole component 500a and the inner region 518 of the upper sheet 500 will not be compressed by the distal ends 436 of the cavity wall 414. Accordingly, the inner surface 504a of the outsole component 500a and the inner surface 504 of the upper sheet 500 can be separated from each other to form a space 522 between the inner regions 518, 518a. Particularly, the upper sheet 500 and the outsole component 500a are separated from each other by the space 522 between the distal ends 436 of the cavity wall 414 to allow for fluid to pass freely through the space 522 from one cavity 416 to another during the vacuum forming step of FIG. 8C.

Figure 8C:
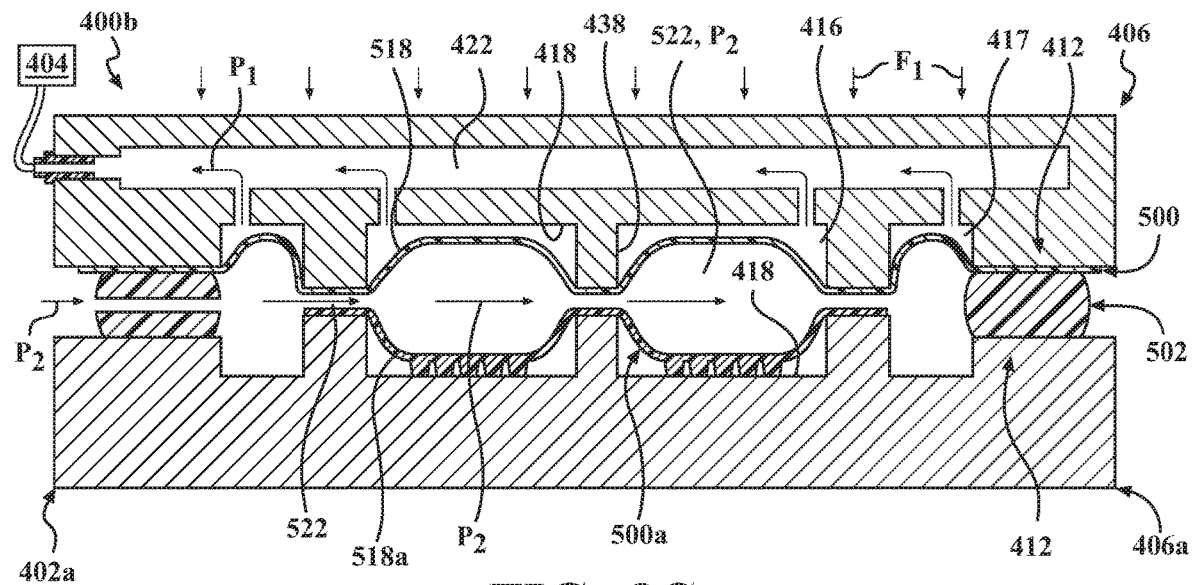

Turning now to FIG. 8C, when the mold is in the first position and the peripheral region 516 of the upper sheet 500 is sealed between the gasket 502 and the chamber wall 412 of the upper platen 406, the vacuum source 404 is activated to generate the negative first pressure $P_1$ within the manifold 422 of the upper platen 406. In this example, only the upper platen 406 includes the manifold 422 and ports 424 for vacuum forming the upper sheet 500. As discussed above, the outsole component 500a is pre-formed with the desired geometry of the bladder 300c and is positioned within the mold 402a. Accordingly, the first pressure $P_1$ does not need to be provided in the mold cavities 416 of the lower platen 406a.

The first pressure $P_1$ may be any pressure that is less than a second pressure $P_2$ within the space 522 between the upper sheet 500 and the outsole component 500a. In the illustrated example, the second pressure $P_2$ within the space 522 is atmospheric or ambient pressure and the first pressure $P_1$ is less than atmospheric pressure. However, as discussed above, in some examples, the space 522 may be provided with a positive second pressure $P_2$ (i.e., greater than atmospheric) in addition or as an alternative to the first pressure $P_1$. The first pressure $P_1$ is applied to each of the cavities 416, 417 of the mold 402a through respective ones of the ports 424. Consequently, the pressure differential between the negative first pressure $P_1$ within the cavities 416 and the ambient or positive second pressure $P_2$ within the space 522 causes the upper sheet 500 to be drawn towards surfaces 418, 438 defining each of the cavities 416, 417.

Here, the magnitude of the first pressure $P_1$ determines the amount that the upper sheet 500 is drawn into the cavities 416 of the mold 402a and, ultimately, the shape and pressure of the chambers 310 of the bladder 300. As discussed above, the upper sheet 500 is formed of an elastomeric material. Accordingly, when the first pressure $P_1$ is provided within the cavities 416 of the mold 402a, the upper sheet 500 is drawn into the cavities 416 by an amount corresponding to the magnitude of the first pressure $P_1$. For example, a first pressure $P_1$ having a greater magnitude will draw the upper sheet 500 farther into the mold cavities 416 by stretching the inner region 518 to a greater degree than a first pressure $P_1$ having a lesser magnitude. In the example of FIG. 8C, the magnitude of the first pressure $P_1$ is sufficient to draw the upper sheet 500 partially into the mold cavities 416 without contacting the surfaces 418, 438 defining the mold cavities 416. However, as discussed below, in other examples, the magnitude of the first pressure $P_1$ may be different, such that the inner region 518 of the upper sheet 500 is drawn against the surfaces 418, 438 of the mold 402a.

As the upper sheet 500 is drawn into the cavities 416 by the first pressure $P_1$, fluid, such as air and/or nitrogen, flows into the space 522 between the sheets 500 through the conduit 514 formed through the gasket 502. Accordingly, a volume of the space 522 is able to increase without causing the second pressure $P_2$ within the space 522 to decrease, thereby allowing the upper portions of the chambers 310 of the bladder 300c to be formed within each of the cavities 416. In the illustrated example, the conduit 514 is in communication with atmospheric pressure, whereby the pressure $P_2$ will remain substantially equal to atmospheric pressure as the chambers 310 are formed. However, in other examples, the conduit 514 may be in communication with a positive pressure source, such as a pump or vessel (not shown), whereby the pressure $P_2$ within the space 522 is greater than atmospheric pressure.

Figure 8D:
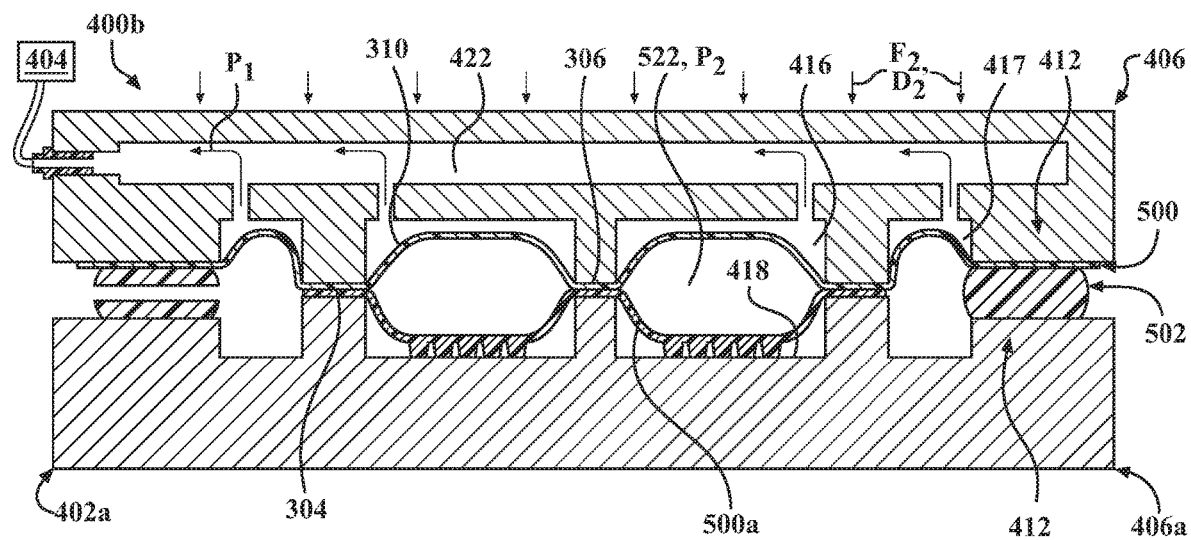

Referring to FIG. 8D, once the inner region 518 of the upper sheet 500 is drawn into the cavities 416, thereby forming upper portions of the chambers 310 of the bladder 300c, the mold 402a is moved to the second position to seal the inner surface 504 of the upper sheet 500 against the inner surface 504a of the outsole component 500a in the inner regions 518, 518a, as indicated by the directional arrows $D_2$. In the second position, a sealing force $F_2$ is applied to the components 500, 500a, 502 such that the inner regions 518, 518a are compressed together by the opposing distal ends 428 of the cavity walls 414 to seal the interior void 308 of each chamber 310. Particularly, the peripheral portions 414a of the cavity walls 414 seal portions of the inner regions 518, 518a corresponding to the peripheral seam 304 of the bladder 300c, while the interior portions 414b of the cavity walls 414 seal portions of the inner region 518 corresponding to the interior bonds 306 of the bladder 300c.

Figure 8E:
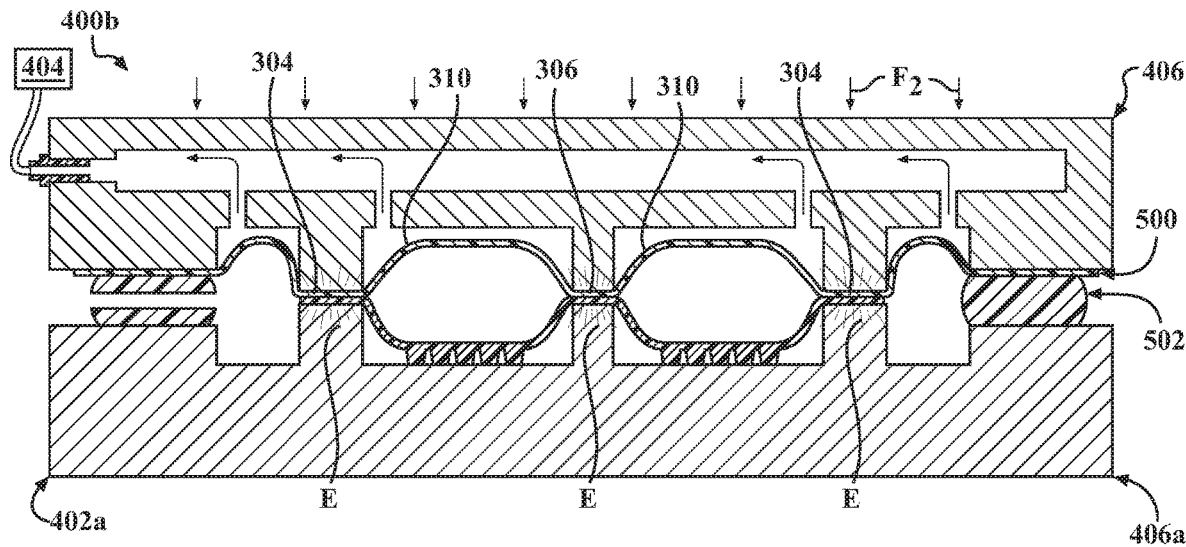

As shown in FIG. 8E, with the chambers 310 formed and the inner regions 518, 518a of the upper sheet 500 and the outsole component 500a sealed between the cavity walls 414, energy E is provided to the distal ends 428 of at least one of the cavity walls 414 to bond the compressed regions of the sheet 500 and the outsole component 500a together, thereby forming the peripheral seam 304 and the interior bonds 306 of the bladder 300. As discussed above, the energy E provided to the distal ends 428 of the cavity walls 414 may be high frequency electromagnetic energy for radio-frequency (RF) welding the upper sheet 500 and the outsole component 500a together. In other examples, the energy E may be a thermal energy, whereby the upper sheet 500 and the outsole component 500a are melded together at the peripheral seam 304 and the interior bonds 306.

Figure 8F:
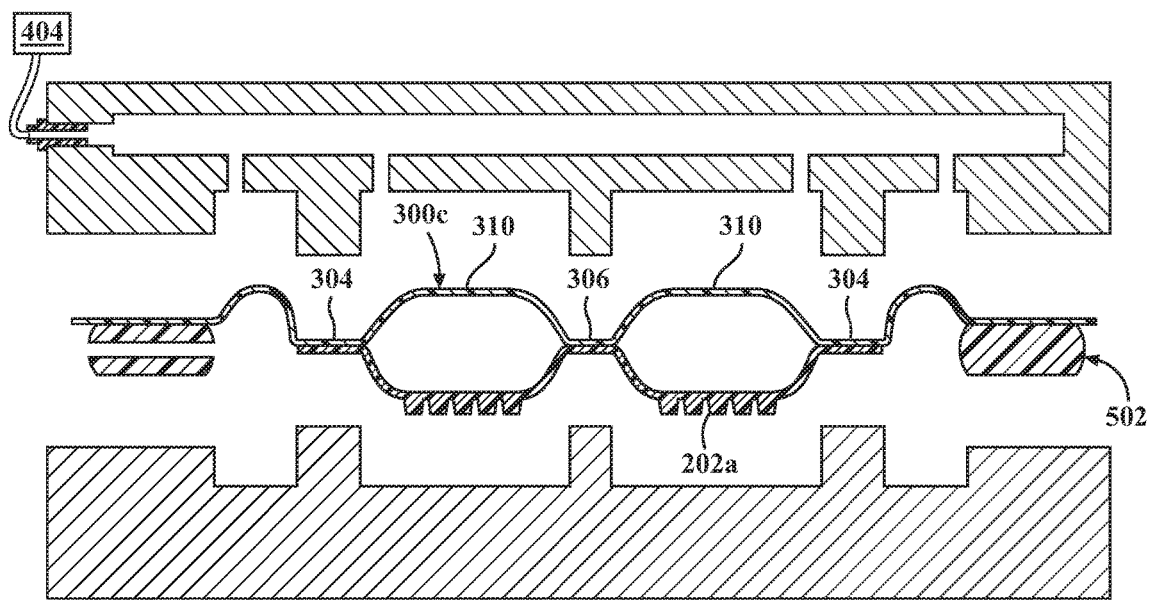

At FIG. 8F, the molded components 500, 500a, 502, which have been Formed into the bladder 300c, are removed from the mold 402a for post-processing. As discussed above, during the mold process a first pressure $P_1$ is applied to the outer surface 506 of the upper sheet 500 to draw the upper sheet 500 into the mold cavities 416. The first pressure $P_1$ is maintained on the upper sheet 500 while the upper sheet 500 is formed into an upper barrier layer 302 of the bladder 300c, such that the second pressure $P_2$ within the space 522 between the upper sheet 500 and the outsole component 500a is sealed within the interior voids 308 of the chambers 310 while the upper sheet 500 is in a stretched state. Upon removal of the molded bladder 300c from the mold 402a, the first pressure $P_1$ is released and the elasticity of the material forming the upper sheet 500 may cause the upper sheet 500 (now barrier layer 302) to contract.

Upon contraction, the fluid within the interior voids 308 of the chambers 310 may be compressed by the upper sheet 500, such that the pressure of the fluid within the interior void 308 may increase. The magnitude of the pressure increase in the interior void 308 is directly related to the strain imparted on the upper sheet 500 by the first pressure $P_1$, as well as the modulus of elasticity of the material forming the sheet 500. For example, where the upper sheet 500 is formed of an inelastic material, the pressure increase may be negligible as the upper sheet 500 will remain in the stretched state upon release of the first pressure $P_1$. However, for materials having a relatively low modulus of elasticity, applying a greater first pressure $P_1$ to the upper sheet 500 causes increased strain in the elastomeric material during the molding process, which results in a greater pressure increase within the interior void 308 when the first pressure $P_1$ is released and the upper sheet 500 contracts.

Figure 8G:
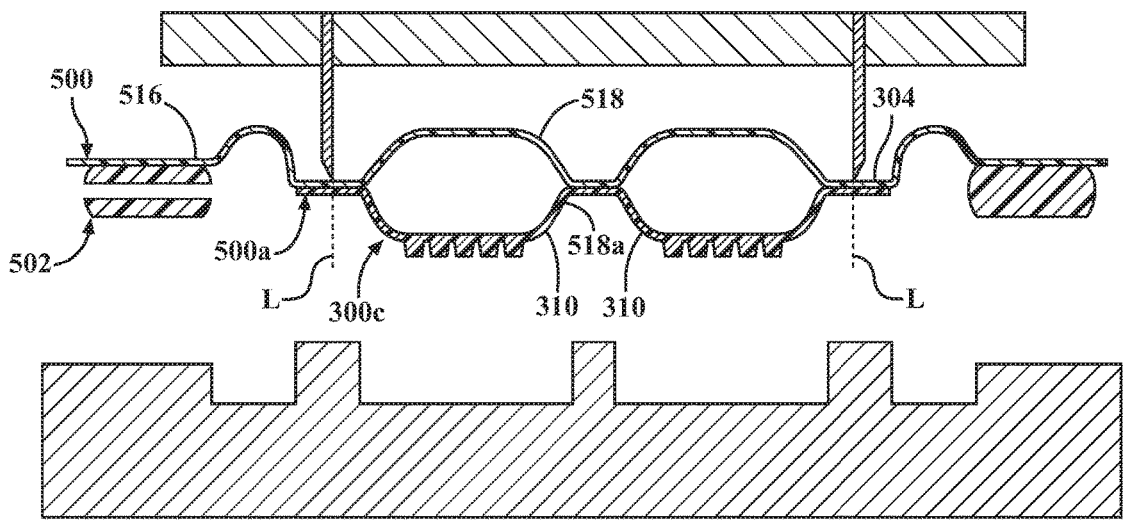
Figure 8H:
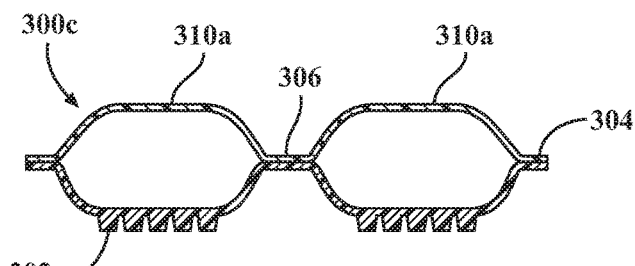

With continued reference to FIG. 8G, the bladder 300c is finished by trimming the upper sheet 500 and the outsole component 500a at the cut line L along the peripheral seam 304 to separate the peripheral region 516 of the supper sheet 500 and the gasket 502 from the formed bladder 300c. Because the gasket 502 and the peripheral region 516 of the upper sheet 500 are not bonded to each other during the molding process, the gasket 502 can be separated from the trimmed peripheral portions 516 of the sheets 500 for reuse in subsequent molding operations. At FIG. 8H, an example of a finished bladder 300c including an upper barrier layer 302 formed from a sheet 500 and a lower barrier layer 302a formed form an outsole component 500a is shown. As discussed above, the lower barrier layer 302a includes an integrally formed outsole 202a and is configured to form a portion of a ground-engaging surface 26 of the sole structure 200b (FIG. 10).

With reference to FIGS. 9 and 10, examples of articles of footwear 10a, 10b including bladders 300, 300c formed according to the methods of FIGS. 5A-8H are shown. In one example, shown in FIG. 9, the bladder 300 is incorporated within a midsole 204a of a sole structure 200a, such that the bladder 300 serves as a cushioning element and is encapsulated by a foam cushioning material. In another example, shown in FIG. 10, the bladder 300c includes the integrally-formed outsole 202a and is attached to a bottom portion of a midsole 204b. As provided above, the illustrated examples of the bladders 300, 300c are provided as generic representations of bladders 300, 300c that could be formed using the disclosed systems 400, 400a, 400b and methods. Accordingly, bladders 300, 300c having any geometries and any number of chambers 310 could be formed and incorporated into sole structures. For example, a bladder 300, 300c having chambers 310 extending through one or more of the forefoot region 20, the mid-foot region 22, and/or the heel region 24 may be formed using the disclosed systems 400, 400a, 400b and methods.

By forming bladders 300-300c using the systems 400, 400a, 400b and methods described above, manufacturing complexities can be minimized compared to methods and systems known in the art. For example, moving the mold 402, 402a to the first position, whereby exterior surfaces 506 of the sheets 500 are sealed against the gasket 502 while a space 522 is maintained between interior surfaces 504, 504a of the components 500, 500a, allows the barrier layers 302 to be formed while simultaneously providing the second pressure $P_2$ to the interior void 308 of the bladder 300-300c. Accordingly, each of the chambers 310 can be pressurized contemporaneously with the formation of the chambers 310. Thus, the current method advantageously allows any number of chambers 310 to be simultaneously formed, pressurized, and sealed in a single process.

In addition to improved efficiency, the methods and systems of the present disclosure allow for the formation of bladders having greater geometrical complexity and increased depth. In conventional bladder forming methods, substantially flat sheets of polymers are bonded to each other and then inflated. Thus, chamber geometry and depth (i.e., distance between barrier layers) is limited by material stretch and pliability. The method and system of the present disclosure minimizes these restrictions by allowing the geometries of the chambers to be formed and pressurized before the barrier layers are bonded. Thus, the materials for each barrier layer are free to be drawn into the cavities of the mold as needed, and are not restricted by pre-formed bonds.

The following Clauses provide exemplary methods for forming a bladder in accordance with the principles of the present disclosure.

Clause 1: A method for forming a bladder, the method comprising inserting a first sheet and a second sheet into a mold, disposing a gasket adjacent to at least one of the first sheet and the second sheet to define a space between the first sheet and the second sheet, the gasket including a conduit in fluid communication with the space, moving at least one of the first sheet and the second sheet away from the other of the first sheet and the second sheet to expand a volume of the space, and drawing a fluid through the conduit and into the expanded space.

Clause 2: The method of Clause 1, further comprising moving the mold to a first position to compress the gasket between the first sheet and the second sheet.

Clause 3: The method of Clause 2, further comprising spacing the first sheet apart from the second sheet when the mold is in the first position.

Clause 4: The method of Clause 2, further comprising moving the mold to a second position to compress an inner region of the first sheet against an inner region of the second sheet.

Clause 5: The method of Clause 4, further comprising attaching the first sheet to the second sheet.

Clause 6: The method of Clause 5, wherein attaching the first sheet to the second sheet includes welding the first sheet to the second sheet.

Clause 7: The method of Clause 1, further comprising bonding the first sheet to the second sheet.

Clause 8: The method of Clause 1, further comprising bonding the first sheet to the second sheet after the fluid is drawn into the expanded space.

Clause 9: The method of Clause 1, wherein drawing a fluid through the conduit and into the expanded space includes drawing atmospheric air into the expanded space.

Clause 10: The method of Clause 1, further comprising removing the gasket from the bladder.

Clause 11: A method for forming a bladder, the method comprising inserting a first sheet and a second sheet into a mold, disposing a gasket adjacent to at least one of the first sheet and the second sheet to define a space between the first sheet and the second sheet, compressing the gasket against the at least one of the first sheet and the second sheet to seal the space between the first sheet and the second sheet, moving at least one of the first sheet and the second sheet away from the other of the first sheet and the second sheet to expand a volume of the space, and drawing a fluid through the gasket and into the expanded space.

Clause 12: The method of Clause 11, wherein drawing a fluid through the gasket includes drawing the fluid through a conduit defined by the gasket.

Clause 13: The method of Clause 11, further comprising spacing the first sheet apart from the second sheet when the gasket is compressed and the mold is in a first position.

Clause 14: The method of Clause 13, further comprising moving the mold to a second position to compress an inner region of the first sheet against an inner region of the second sheet.

Clause 15: The method of Clause 14, further comprising attaching the first sheet to the second sheet.

Clause 16: The method of Clause 15, wherein attaching the first sheet to the second sheet includes welding the first sheet to the second sheet.

Clause 17: The method of Clause 11, further comprising bonding the first sheet to the second sheet.

Clause 18: The method of Clause 11, further comprising bonding the first sheet to the second sheet after the fluid is drawn into the expanded space.

Clause 19: The method of Clause 11, wherein drawing a fluid through the gasket and into the expanded space includes drawing atmospheric air into the expanded space.

Clause 20: The method of Clause 11, further comprising removing the gasket from the bladder.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A method for forming a bladder, the method comprising:
   inserting a first sheet and a second sheet into a mold;
   disposing a gasket adjacent to at least one of the first sheet and the second sheet to define a space between the first sheet and the second sheet, the gasket including a conduit in fluid communication with the space;
   moving at least one of the first sheet and the second sheet away from the other of the first sheet and the second sheet to expand a volume of the space; and drawing a fluid through the conduit and into the expanded space.

2. The method of claim 1, further comprising moving the mold to a first position to compress the gasket between the first sheet and the second sheet.

3. The method of claim 2, further comprising spacing the first sheet apart from the second sheet when the mold is in the first position.

4. The method of claim 2, further comprising moving the mold to a second position to compress an inner region of the first sheet against an inner region of the second sheet.

5. The method of claim 4, further comprising attaching the first sheet to the second sheet.

6. The method of claim 5, wherein attaching the first sheet to the second sheet includes welding the first sheet to the second sheet.

7. The method of claim 1, further comprising bonding the first sheet to the second sheet.

8. The method of claim 1, further comprising bonding the first sheet to the second sheet after the fluid is drawn into the expanded space.

9. The method of claim 1, wherein drawing a fluid through the conduit and into the expanded space includes drawing atmospheric pressure into the expanded space.

10. The method of claim 1, further comprising removing the gasket from the bladder.

11. A method for forming a bladder, the method comprising:
    inserting a first sheet and a second sheet into a mold;
    disposing a gasket adjacent to at least one of the first sheet and the second sheet to define a space between the first sheet and the second sheet;
    compressing the gasket against the at least one of the first sheet and the second sheet to seal the space between the first sheet and the second sheet;
    moving at least one of the first sheet and the second sheet away from the other of the first sheet and the second sheet to expand a volume of the space; and
    drawing a fluid through a conduit defined by the gasket and into the expanded space.

12. The method of claim 11, further comprising spacing the first sheet apart from the second sheet when the gasket is compressed and the mold is in a first position.

13. The method of claim 12, further comprising moving the mold to a second position to compress an inner region of the first sheet against an inner region of the second sheet.

14. The method of claim 13, further comprising attaching the first sheet to the second sheet.

15. The method of claim 14, wherein attaching the first sheet to the second sheet includes welding the first sheet to the second sheet.

16. The method of claim 11, further comprising bonding the first sheet to the second sheet.

17. The method of claim 11, further comprising bonding the first sheet to the second sheet after the fluid is drawn into the expanded space.

18. The method of claim 11, wherein drawing a fluid through the gasket and into the expanded space includes drawing atmospheric air into the expanded space.

19. The method of claim 11, further comprising removing the gasket from the bladder.

* * * * *